(12) United States Patent
Regan et al.

(10) Patent No.: US 12,005,734 B2
(45) Date of Patent: Jun. 11, 2024

(54) WHEEL HUB ASSEMBLY

(71) Applicant: Consolidated Metco, Inc., Vancouver, WA (US)

(72) Inventors: Connor Regan, Vancouver, WA (US); Samant Khanna, Vancouver, WA (US)

(73) Assignee: Consolidated Metco, Inc., Vancouver, WA (US)

( * ) Notice: Subject to any disclaimer, the term of this patent is extended or adjusted under 35 U.S.C. 154(b) by 832 days.

(21) Appl. No.: 17/084,786

(22) Filed: Oct. 30, 2020

(65) Prior Publication Data
US 2021/0129582 A1 May 6, 2021

Related U.S. Application Data

(60) Provisional application No. 62/929,376, filed on Nov. 1, 2019.

(51) Int. Cl.
*B60B 27/00* (2006.01)
*F16C 33/78* (2006.01)
(Continued)

(52) U.S. Cl.
CPC ...... *B60B 27/0073* (2013.01); *B60B 27/0078* (2013.01); *F16C 33/7886* (2013.01);
(Continued)

(58) Field of Classification Search
CPC .............. B60B 27/001; B60B 27/0078; B60B 2380/14; B60B 27/0073; F16C 2326/02;
(Continued)

(56) References Cited

U.S. PATENT DOCUMENTS 3,064,982 A * 11/1962 Stephens ............. B60B 27/0073
384/485
3,114,558 A 12/1963 Rhoads
(Continued)

FOREIGN PATENT DOCUMENTS

| AU | 2013206447 B2 | 7/2013 |
|---|---|---|
| EP | 3398835 A1 | 11/2018 |
| WO | 2018231591 | 12/2018 |

OTHER PUBLICATIONS

PCT Search Report and Written Opinion from International Application No. PCT/US2020/058215 dated Feb. 8, 2021; 12 pages.
(Continued)

*Primary Examiner* — Kip T Kotter
(74) *Attorney, Agent, or Firm* — Fitch, Even, Tabin & Flannery LLP

(57) ABSTRACT

In one aspect of the present disclosure, a wheel hub assembly is provided that includes a hub body having an outboard end portion and an inboard end portion, a bearing assembly, and a seal. The seal includes a seal case and a sleeve. The hub body and seal case are rotatable relative to the sleeve. The wheel hub assembly further includes a stop of the bearing assembly configured to resist movement of the sleeve toward the outboard end portion of the hub body as the hub body, bearing assembly, and sleeve are advanced together in an inboard direction along a vehicle spindle. The stop permits the bearing assembly to transfer a force applied in an inboard axial direction against the bearing assembly, such as by tightening of a spindle nut, to the sleeve and urge the sleeve along a vehicle spindle.

36 Claims, 14 Drawing Sheets

(51) Int. Cl.
*F16C 35/063* (2006.01)
*F16C 43/04* (2006.01)
*F16J 15/3256* (2016.01)

(52) U.S. Cl.
CPC .......... *F16C 35/063* (2013.01); *F16C 43/045* (2013.01); *F16J 15/3256* (2013.01); *B60B 27/001* (2013.01); *B60B 2380/14* (2013.01); *F16C 2326/02* (2013.01)

(58) Field of Classification Search
CPC .... F16C 43/045; F16C 33/7886; F16C 35/12; F16C 35/063; F16J 15/3256
See application file for complete search history.

(56) References Cited

U.S. PATENT DOCUMENTS

| | | | | |
|---|---|---|---|---|
| 3,500,091 | A | * | 3/1970 | Jones ...................... G01P 3/443 310/90 |
| 5,292,119 | A | | 3/1994 | Hosbach |
| 5,292,199 | A | | 3/1994 | Hosbach |
| 5,757,084 | A | | 5/1998 | Wagner |
| 6,149,244 | A | | 11/2000 | Wagner |
| 7,780,243 | B2 | | 8/2010 | Lippis |
| 8,292,373 | B2 | | 10/2012 | Rieger |
| 10,794,491 | B2 | | 10/2020 | Jimenez |
| 2007/0052287 | A1 | | 3/2007 | White |
| 2008/0124017 | A1 | * | 5/2008 | Umekida ............... F16C 43/045 384/477 |
| 2009/0245969 | A1 | * | 10/2009 | White .................... B60B 27/02 411/215 |
| 2010/0301665 | A1 | * | 12/2010 | White ................. B60B 27/0057 301/105.1 |
| 2011/0262063 | A1 | * | 10/2011 | Dittmar ................ F16J 15/3276 384/147 |
| 2013/0182985 | A1 | | 7/2013 | Yokota |
| 2017/0028777 | A1 | | 2/2017 | Lv |
| 2020/0292000 | A1 | * | 9/2020 | Yu ....................... F16C 33/7823 |

OTHER PUBLICATIONS

Freudenberg Sealing Technologies GmbH; Simmerring and Rotary Seals—vol. 11 Global Catalog; 2015; 204 pages.
Invitation to Pay Additional Fees from corresponding International Application No. PCT/US2020/058215 dated Dec. 3, 2020; 2 pages.
Extended European Search Report from related European Patent Application No. 20881779.1 dated Oct. 10, 2023; 10 pages.
Canadian Office Action from related Canadian Application No. 3,157,988 dated Dec. 15, 2023; 11 pages.

* cited by examiner

WHEEL HUB ASSEMBLY

CROSS-REFERENCE TO RELATED APPLICATION

This application claims the benefit of U.S. Provisional Patent Application No. 62/929,376, filed Nov. 1, 2019, which is hereby incorporated by reference herein in its entirety.

FIELD

This disclosure relates to wheel hub assemblies for vehicles and, more specifically, relates to wheel hub assemblies having seals to protect bearing assemblies of the wheel hub assemblies.

BACKGROUND

Wheel hub assemblies, sometimes referred to as wheel ends, are used to connect wheels to axles of vehicles. The use of a pre-adjusted wheel hub assembly with an axle may involve a no-back-off installation of the wheel hub assembly onto a spindle associated with the axle. The wheel hub assembly may include one or more seals for protecting one or more bearing assemblies of the wheel hub assembly.

The seal may include two primary components, a static sleeve and a rotatable seal case. The seal case may include an oil-sealing main lip of the seal. The sleeve and seal case are unitized or rotatably connected to prevent axial separation. The rotatable connection allows for a minimum of axial movement between the two components but does not restrict rotation of the hub body and seal mounted thereto relative to the spindle and sleeve.

Wheel hub assemblies are traditionally installed onto a vehicle spindle by first installing a cassette seal, which includes the rotatably connected seal and sleeve, into a seal bore of a hub of the wheel hub assembly. The seal case is positioned within the bore by a surface of the bore or by a specially designed tool. At this point, the sleeve is not in its final operating position.

The sleeve must form a static seal with the spindle, which necessitates an interference fit between the inner diameter of the sleeve and the mating journal of the spindle. The next step in the installation process involves advancing the hub-seal assembly onto the vehicle spindle and tightening a spindle nut of the wheel hub assembly to apply an axial force on the hub-seal assembly and shift the hub-seal assembly axially in an inboard direction along the spindle seal journal to an operative position along the spindle seal journal. The axial force applied by the spindle nut overcomes the interference between the sleeve and the spindle.

As a result of the interference between the sleeve and the journal, when the spindle locknut is tightened, an axial force acts against the sleeve, compressing the sleeve against the seal case which must later rotate relative to the sleeve during vehicle operation. The traditional engineering solution is to incorporate a sacrificial bumper axially between the sleeve and seal case to bear the axially-directed installation force between the sleeve and the seal case. The sacrificial bumper wears away during operation of the vehicle until a clearance is formed between the sleeve and the seal case. This wearing or bedding-in process can generate extreme temperatures in excess of 600° F. which can be detrimental to the long- and short-term performance of the main sealing lip of the seal case and may lead to premature failure of the main sealing lip. The seal engineer, when utilizing a sacrificial bumper, must be cautious not to over-specify the interference fit between sleeve inner diameter and the spindle journal. A larger amount of interference leads to a higher axial load as the hub-seal assembly is installed on the axle journal. A higher axial load on the sacrificial bumper may lead to increased risk of failure in the case of a fractured or over-worn bumper, and in general may lead to higher operating temperatures.

The bedding-in process of the sacrificial bumper also has a negative impact on the fuel economy of the vehicle. Specifically, the contact between the sacrificial bumper, the sleeve, and the seal case accounts for a significant portion of the overall drag torque of a wheel hub assembly.

SUMMARY

In accordance with one aspect of the present disclosure, a wheel hub assembly is provided that includes a hub body having an outboard end portion and an inboard end portion, a bearing assembly, and a seal. The seal includes a seal case and a sleeve. The hub body and seal case are rotatable relative to the sleeve. The wheel hub assembly further includes a stop of the bearing assembly configured to resist movement of the sleeve toward the outboard end portion of the hub body as the hub body, bearing assembly, and seal are advanced in an inboard direction along a vehicle spindle. The stop permits the bearing assembly to transfer a force applied in an inboard axial direction against the bearing assembly, such as by tightening of a spindle nut, to the sleeve and urge the sleeve along the vehicle spindle. The sleeve may thereby be advanced along the vehicle spindle via contact with the bearing assembly stop rather than relying on the seal case to urge the sleeve along the vehicle spindle. This permits the seal to be provided without a consumable bumper between the sleeve and seal case, which decreases the operating temperature of the seal and reduces drag torque caused by friction within the seal.

The present disclosure also provides an apparatus for a wheel hub assembly that includes a cassette seal and a bearing assembly. The cassette seal includes a sleeve having a central opening sized to form an interference fit with a vehicle spindle. The cassette seal further includes a seal case that is rotatable relative to the sleeve about a central axis. The bearing assembly has an inboard side and an outboard side and comprises an inner ring, an outer ring, a plurality of bearings, and a stop. The stop is configured to contact the sleeve and inhibit outboard axial movement of the sleeve beyond a predetermined axial position as the bearing assembly and cassette seal are advanced in an inboard axial direction along a vehicle spindle. In this manner, the stop of the bearing assembly may be utilized to move the sleeve along the vehicle spindle to an operative position thereon.

In another aspect of the present disclosure, a wheel hub assembly is provided that includes a hub body, a bearing assembly, a seal case mounted to the hub body, and a sleeve that permits the seal case to rotate relative to the sleeve. The wheel hub assembly includes a metallic, radially inner portion of the sleeve having a central opening to receive a vehicle spindle and configured to form an interference fit therewith. The wheel hub assembly further includes a radially inner surface of the metallic, radially inner portion of the sleeve configured to directly contact the vehicle spindle and transfer heat thereto. The metallic, radially inner portion of the sleeve thereby operates as a conduit to transfer heat to the vehicle spindle, which is often a large steel component that functions as a heat sink. By transferring heat away from the seal case and seal, the operating temperature of the seal case and sleeve may be kept at a lower temperature which may prolong the life of the wheel hub assembly.

In one embodiment, the seal case includes a main sealing lip that contacts a radially outer surface of the metallic, radially inner portion of the sleeve. The contact between the seal case main sealing lip and the radially outer surface of the metallic, radially inner portion of the sleeve generates heat as the seal case rotates about the sleeve. The metallic, radially inner portion of the sleeve transfers this heat, such as by conduction, to the vehicle spindle.

The present disclosure also provides a method of installing a preassembled wheel hub assembly on a vehicle spindle. The method includes aligning opening of a bearing assembly and seal of the preassembled wheel hub assembly with the vehicle spindle. The method includes advancing the preassembled wheel hub assembly in an axial, inboard direction along the vehicle spindle to engage the sleeve with the vehicle spindle. The method further includes urging the sleeve along the vehicle spindle via contact between the bearing assembly and the sleeve with continued advancing of the bearing assembly in the axial, inboard direction along the vehicle spindle. The method permits the sleeve of the seal assembly to be accurately positioned along the vehicle spindle because the bearing assembly stop overcomes the interference fit between the sleeve and the vehicle spindle and shifts the sleeve along the vehicle spindle until the sleeve reaches a predetermined position on a seal journal of the vehicle spindle.

DETAILED DESCRIPTION

Figure 1:
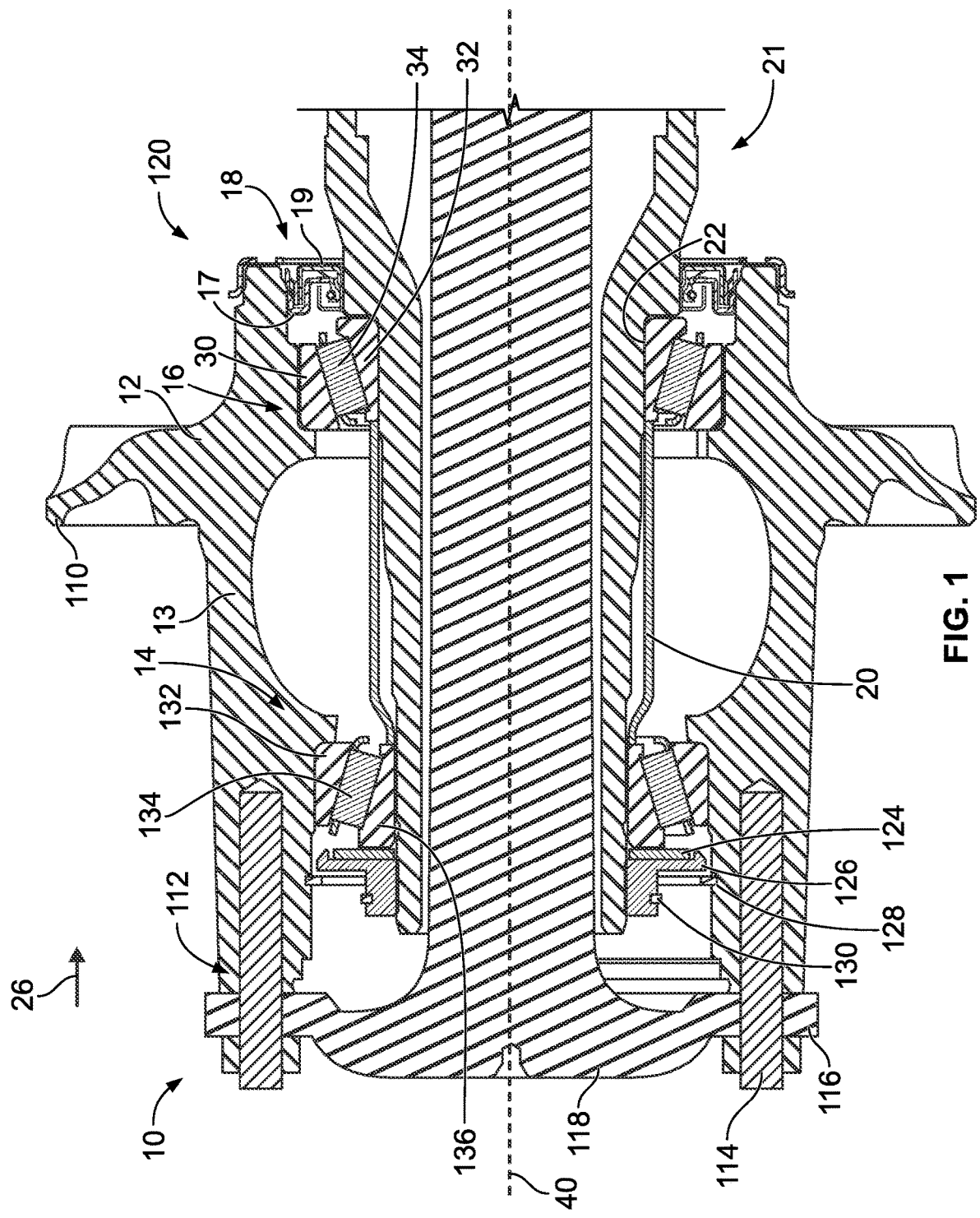
FIG. 1 is a cross-sectional view of a wheel hub assembly including inboard and outboard bearing assemblies and a seal near the inboard bearing assembly.
Figure 2:
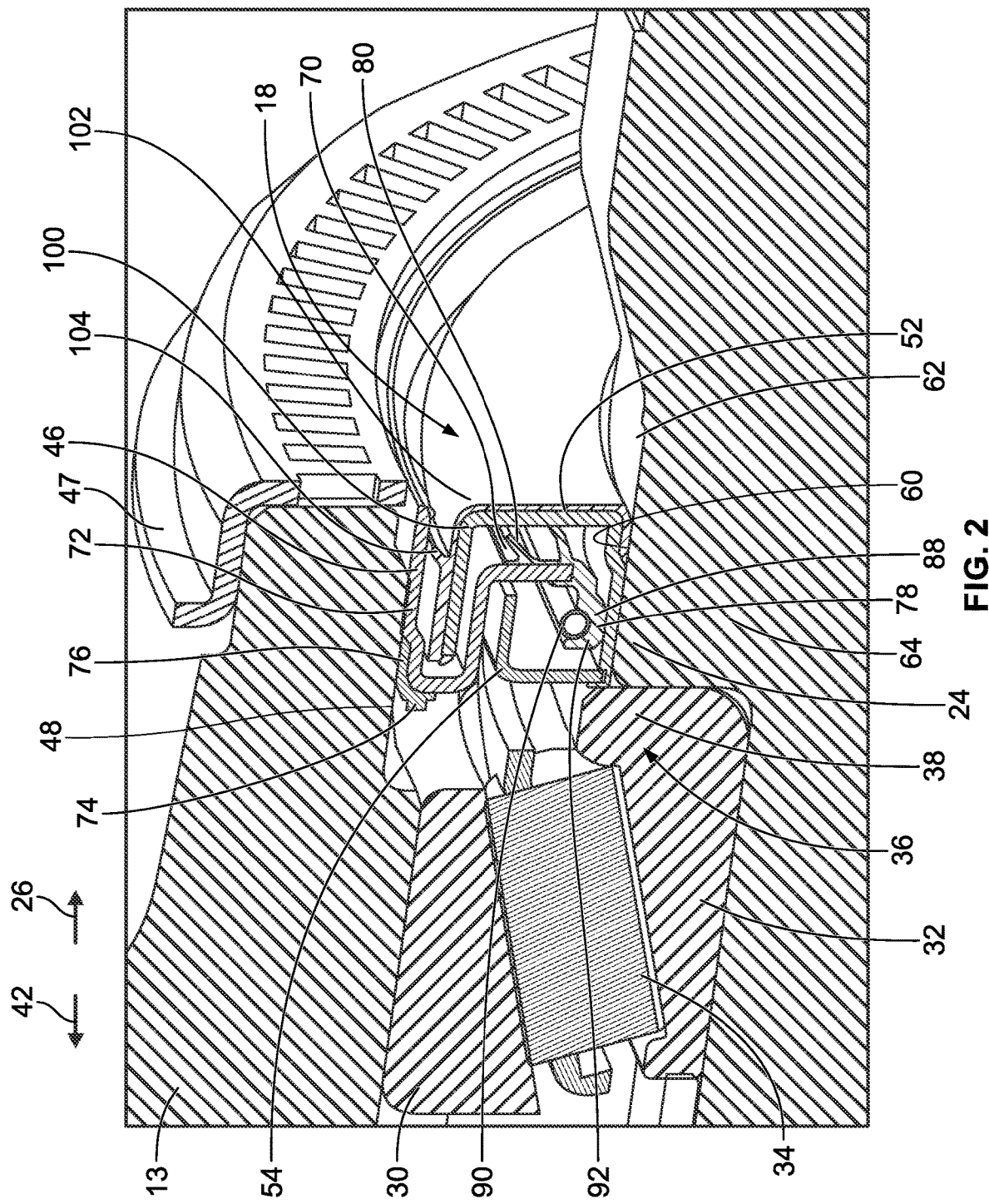
FIG. 2 is a cross-sectional view of a portion of the wheel hub assembly of FIG. 1 showing a sleeve, a seal case, and a retainer of the seal.

Regarding FIGS. 1 and 2, a wheel hub assembly 10 is provided that includes a wheel hub 12 having a hub body 13, an outboard bearing assembly 14, an inboard bearing assembly 16, a cassette seal such as seal 18, and a spacer 20. The outboard and inboard bearing assemblies 14, 16 permit the hub body 13 to rotate around central axis 40. The wheel hub assembly 10 is assembled onto a vehicle spindle 21, which may include a seal journal 24 (see FIG. 2), by aligning an inner bore 22 of the wheel hub assembly 10 with an outboard end of the spindle 21 and advancing the wheel hub assembly 10 in direction 26 along an outer surface of the spindle 21. Regarding FIG. 1, the seal 18 has an outboard side 17, an inboard side 19, and includes a seal case 46 and a sleeve 52. The sleeve 52 has a central opening sized to receive the seal journal 24 and form an interference fit therewith. The seal case 46 and sleeve 52 are configured to permit the seal case 46 and sleeve 52 to be advanced along the seal journal 24 while withstanding the axial forces generated by the interference between the inner diameter of the sleeve 52 and the outer diameter of the seal journal 24. Further, the seal case 46 and sleeve 52 are configured to be shifted axially along the seal journal 24 and into an operative position without requiring the use of a consumable bumper between the seal case 46 and the sleeve 52.

Regarding FIGS. 1 and 2, the inboard bearing assembly 16 includes an outer ring, such as an inboard bearing cup 30, an inner ring, such as an inboard bearing cone 32, and bearings, such as roller bearings 34. The inboard bearing assembly 16 includes a stop 36 that resists axial movement of a portion of the seal 18 in outboard direction 42 as the wheel hub assembly 10 is advanced in inboard direction 26 along the spindle 21 during assembly of the wheel hub assembly 10 onto the spindle 21. In one embodiment, the stop 36 includes a flange portion 38 of the inboard bearing cone 32. The flange portion 38 extends radially outward and is in overlapping relation in an axial direction parallel to the axis 40 with a portion of the seal 18. In another embodiment, the stop 36 includes a component of the inboard bearing assembly 16 that is distinct from the inboard bearing cone 32, such as a ring (see, e.g., FIG. 14) that is sandwiched between the inboard bearing cone 32 and a shoulder 64 of the spindle 21. In another embodiment, the stop 36 is provided by interference between an outer diameter of the inboard bearing cone 32 and an inner diameter of the sleeve 52 of the seal 18. The interference is configured to create a press-fit engagement between the inboard bearing cone 32 and the sleeve 52 which fixes the sleeve 52 relative to the inboard bearing cone 32.

In the embodiment of FIG. 2, the seal case 46 is engaged with a radially inner surface 48 of the hub body 13 of the wheel hub assembly 10. The hub body 13 may have a unitary, one-piece construction and may be made of a metallic material such as steel, iron, or aluminum as some examples. The seal case 46 has an outer diameter sized to form a press-fit engagement with the hub body radially inner surface 48 that fixes the seal case 46 against rotary and axial movement relative to the hub body 13. The sleeve 52 is rotatably connected to the seal case 46 and permits the hub body 13 and seal case 46 mounted therein to rotate relative to the sleeve 52. The seal 18 includes a retainer 54 that permits the seal 18 to be handled before assembly with the hub body 13 without axial separation of the sleeve 52 from the seal case 46. The wheel hub assembly 10 may be provided as an assembled unit with the seal 18. The seal 18 may also be provided on its own such as a replacement part. In one embodiment, the wheel hub assembly 10 includes an antilock braking system (ABS) tone ring 47.

During assembly of the wheel hub assembly 10 onto the spindle 21, the inboard bearing cone 32 is advanced in direction 26 along the spindle 21 such as by tightening of a spindle nut 126 (see FIG. 1). The sleeve 52 has a radially inner surface 60 that engages a radially outer surface 62 of the seal journal 24 as the wheel hub assembly 10 is advanced in direction 26. The interference between the inner diameter of the sleeve 52 and the outer diameter of the seal journal 24 resists movement of the sleeve 52 in direction 26. To overcome this frictional resistance, the flange portion 38 of the inboard bearing cone 32 abuts an outboard side of the sleeve 52 and transfers the axial force from the spindle nut 126 to the sleeve 52. Continued advancing of the inboard bearing cone 32 in inboard direction 26 overcomes the interference between the sleeve 52 and the seal journal 24 and urges the sleeve 52 to an operative position along the seal journal 24 (see FIG. 2). The advancing of the inboard bearing cone 32 and the sleeve 52 in direction 26 may include turning of the inboard bearing cone 32 and/or the sleeve 52.

The tightening of the spindle nut 126 also urges the hub body 13 and seal case 46 mounted thereto in direction 26 concurrent with movement of the inboard bearing cone 32 and the sleeve 52 along the spindle 21. In this manner, the sleeve 52 abutting the inboard bearing cone flange portion 38 and the seal case 46 mounted to the hub body 13 have a substantially fixed axial spacing therebetween as the seal case 46 and sleeve 52 shift in the axially inboard direction 26 due to the matching axial movement of the hub body 13 and the inboard bearing cone 32. The substantially fixed spacing between the seal case 46 and the sleeve 52 permits a desired spacing to be maintained during advancing of the seal 18 in direction 26 until reaching an operative position along the seal journal 24. Further, the substantially fixed axial spacing between the seal case 46 and sleeve 52, when the seal 18 is at the operative position on the seal journal 24, avoids contact between the seal case 46 and sleeve 52, which reduces frictional resistance to rotation of the hub body 13 and lowers the operating temperature of the seal 18 and wheel hub 10 during vehicle operation. Further, the substantially fixed axial spacing preserves a geometry of a tortuous path 70 formed by the seal case 46 and sleeve 52 during installation of the wheel hub assembly 10 onto the seal journal 24. By substantially fixed axial spacing, it is intended that some minor variation in the axial spacing between the seal case 46 and the sleeve 52 may occur due to material properties and tolerancing (as some examples). But the substantially fixed axial spacing provides a functionally constant effectiveness of the tortuous path 70 formed by the seal case 46 and sleeve 52. For example, the axial distance may be substantially fixed if the axial distance changes less than 0.1 inches during assembly.

When the seal case 46 and sleeve 52 have been advanced to the operative position along the spindle 21 shown in FIG. 2, the interference between the inner diameter of the sleeve 52 and the outer diameter of the seal journal 24 forms a press-fit engagement that fixes the sleeve 52 against rotary and axial movement of the sleeve 52 relative to the seal journal 24.

Regarding FIG. 2, the seal case 46 includes a body 72 which may be made of a metallic material, such as steel, and a sealing member 74, which may be made of a polymeric material, such as an elastomeric material such as rubber. The sealing member 74 may include a radially outer portion 76 and a radially inner portion 78. The radially outer portion 76 engages a radially inner surface 48 of the hub 50. The radially inner portion 78 of the sealing member 74 may include one or more walls 80 that form a portion of the tortuous path 70 as well as a sealing portion 92 that contacts the sleeve 52. The seal 18 further includes a resilient member, such as a garter spring 90, that holds a main lip 88 of the sealing portion 92 in contact with the sleeve 52. The contact between the main lip 88 and the sleeve 52 generates heat as the seal case 46 rotates relative to the sleeve 52 during operation of the vehicle.

In one embodiment, the sleeve 52 includes a body 100 made of a metallic material, such as steel, and a sealing member 102 secured therewith. The sealing member 102 may be made of a polymeric material, such as an elastomeric material such as rubber. The body 100 directly contacts the seal journal 24 and transfers heat generated by the contact between the sealing portion 92 and the body 100 to a heat sink provided by the spindle 21, which is typically made of steel. The sealing member 102 may also include one or more walls 104 that form part of the tortuous path 70.

Regarding FIG. 1, the hub body 13 of the hub 12 includes a flange 110 for mounting a wheel thereto, the flange 110 being shown truncated in FIG. 1 for clarity purposes. The flange 110 may include a plurality of openings that receive fasteners, or may have fasteners embedded therein, for extending through openings of a wheel. The hub body 13 further includes an outboard end portion 112 secured via fasteners, such as bolts 114, to a flange 116 of an axle shaft 118 of the vehicle and an inboard end portion 120. The wheel hub assembly 10 further includes a retainer assembly to maintain the wheel hub assembly 10 on the spindle 21. The retainer assembly may include a spindle nut washer 124, the spindle nut 126, a double wind snap ring 128, and a snap ring retainer 130. The outboard bearing assembly 14 includes an outboard bearing cup 132, roller bearings 134, and an outboard bearing cone 136. The inboard and outboard bearing cones 32, 136 form a press fit engagement with the spindle 21. The spacer 20 maintains a precise axial separation between the inboard and outboard bearing cones 32, 136. The spindle nut 126 compresses the inboard and outboard bearing cones 32, 136 and spacer 20 against the shoulder 64 (see FIG. 2) of the spindle 21. During operation of the vehicle, the axle shaft 118 rotates to generate rotation of the hub body 13 and the wheel attached to the flange 110. Rotation of the hub body 13 generates rotation of the inboard and outboard bearing cups 30, 132 and bearings 34, 134 while the inboard and outboard bearing cones 32, 136 and spacer 20 generally remain stationary on the spindle 21.

Figure 3:
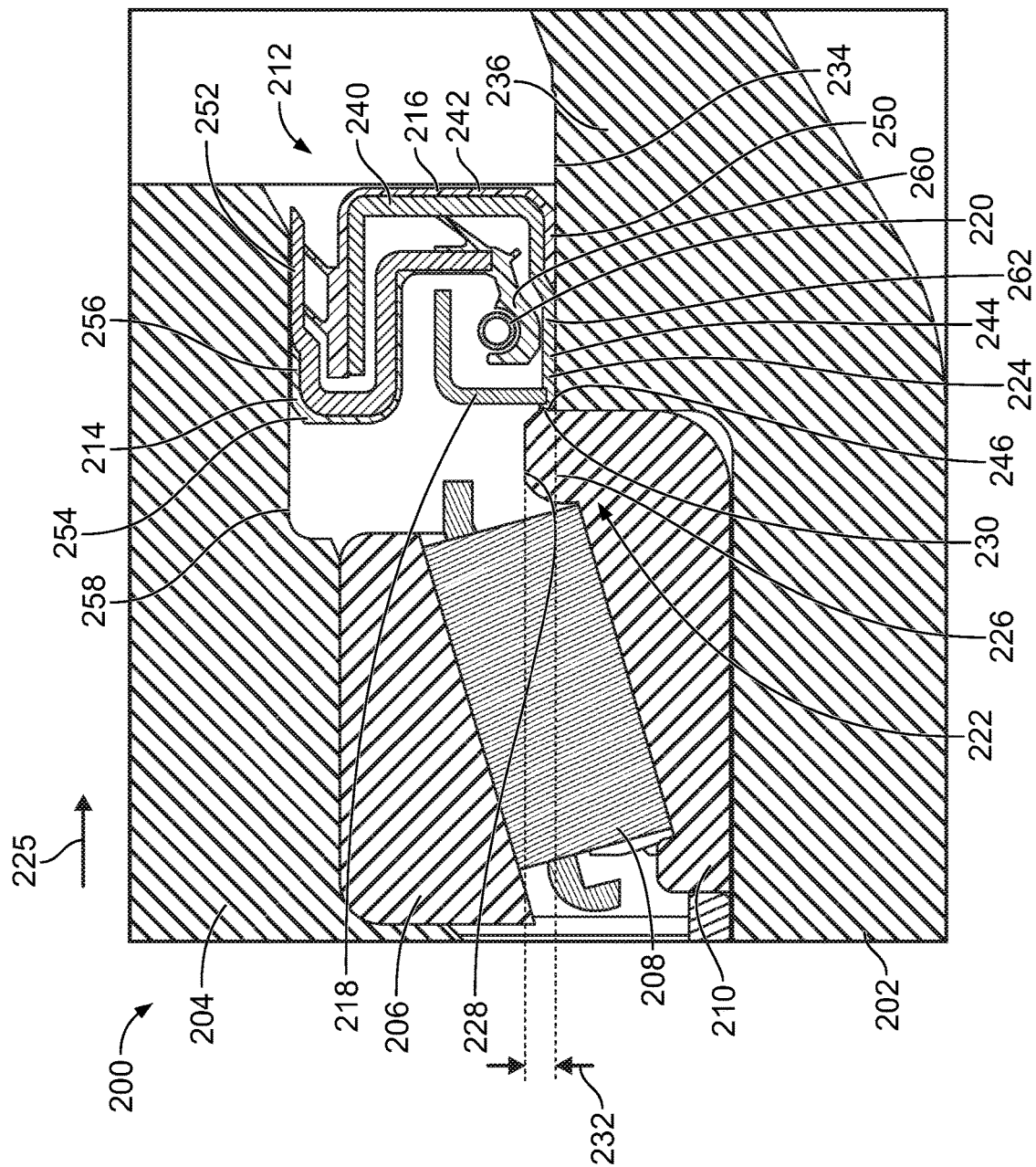
FIG. 3 is a cross-sectional view of a portion of a wheel hub assembly and a spindle seal journal of a vehicle spindle, the wheel hub assembly including a hub body, an inboard bearing assembly, and a seal.

Regarding FIG. 3, a wheel hub assembly 200 is provided that is similar in many respects to the wheel hub assembly 10 discussed above and is mounted to a spindle 202. The wheel hub assembly 200 includes a hub body 204, an inboard bearing cup 206, roller bearings 208, and an inboard bearing cone 210. The wheel hub assembly 200 includes a seal 212 that includes a seal case 214, a sleeve 216, a retainer 218, and a garter spring 220. The inboard bearing cone 210 has a stop 222 that engages a contact portion 224 of the sleeve 216 as the wheel hub assembly 200 is advanced in inboard axial direction 225 during assembly with the spindle 202. The stop 222 includes a flange portion 226 having a radially outer surface 228 and a stop surface 230. The flange portion 226 extends radially outward a distance 232 beyond a radially outer surface 234 of a shoulder 236 of the spindle 202. The distance 232 permits the flange portion 226 to be in overlapping in an axial direction parallel to an axis of rotation of the wheel hub 200 (see, e.g., axis 40 in FIG. 1). The sleeve 216 includes a body 240 and a seal member 242. The inboard bearing cone 210 may be made of metallic material, such as steel, the body 240 of the sleeve 216 may be made of a metallic material, such as steel, and the seal member 242 may be made of a polymeric material, such as an elastomeric material such as rubber. Other examples include plastics and/or resins, such as polytetrafluoroethylene.

The body 240 provides a structural backbone for the sleeve 216 and rigidly contacts the stop 222 of the inboard bearing cone 210 as the wheel hub assembly 200 is advanced in inboard direction 225 along the spindle 202 during installation of the wheel hub assembly 200 onto the spindle 202. The sleeve 216 includes a base, such as a radially inner section 244, that includes the contact portion 224 with a surface 246 thereof that abuts the stop surface 230 of the inboard bearing cone flange portion 226. The radially inner section 244 further includes a leading end portion 250 of the seal member 242 that first contacts the spindle shoulder 236 as the wheel hub assembly 200 is advanced in direction 225 and engages the outer surface 234 of the seal journal 302.

Regarding FIG. 3, the seal case 214 includes a body 252, which may be made of a metallic material such as steel, a rigid plastic, or a composite. The seal case 214 further includes a seal member 254, which may be made of a polymeric material, such as an elastomeric material such as rubber, joined therewith. The body 252 of the seal case 214 provides rigidity to the seal case 214 to form the press fit with the hub body 204, which may be made of a metallic material such as steel, a rigid plastic material, or a composite material. The hub body 204 may be made of aluminum, iron, or steel. The seal member 254 includes a radially outer portion 256 that engages an inner surface of a bore 258 of the hub body 204 and a sealing portion 260 that contacts a radially outer surface 262 of the sleeve 216. The seal member 254 may be made of a polymeric material such as an elastomer such as rubber.

Regarding FIGS. 4-9, a process of mounting the wheel hub assembly 200 on the spindle 202 will be described. Regarding FIG. 4, the seal 212 is shown installed in the hub bore 258 in an initial configuration, with the seal case 214 engaged with the radially inner surface of the hub bore 258. The radially outer section 252 of the seal case 214 includes a radially outer surface 280 that engages the inner surface of the hub bore 258 by, for example, pressing the radially outer section 252 into engagement with the inner surface 258 of the hub bore 258. The seal case 214 further includes an intermediate section 282 and a radially inner section 284. The sleeve 216 includes a radially outer portion 286 that extends into a recess formed between the radially outer section 252 and the intermediate section 282 of the seal case 214. The sleeve 216 further includes an intermediate section 288 and a radially inner section 290. As discussed below, the radially inner section 290 forms a press-fit engagement with the seal journal 302 of the shoulder 236 of the spindle 202.

Figure 4:
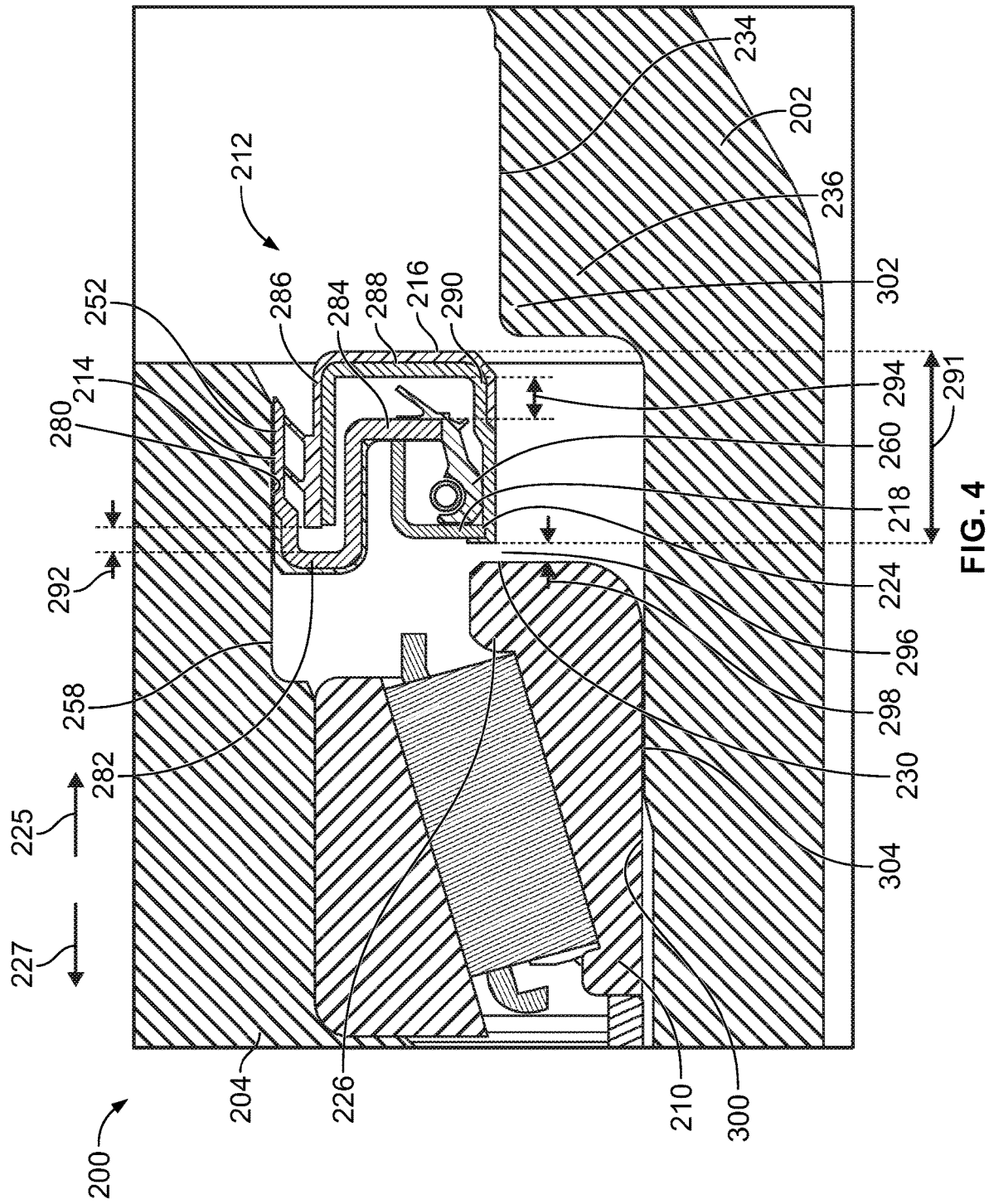
FIG. 4 is a cross-sectional view similar to FIG. 3 showing the hub body being advanced along the spindle seal journal and a contact portion of the sleeve spaced from a flange portion of an inboard bearing cone of the inboard bearing assembly.

Regarding FIG. 4, the seal case 214 is rigidly secured to the hub body 204 and the sleeve 216 may shift axially in direction 225 or direction 227 relative to the seal case 214. The retainer 218 keeps the sleeve 216 from falling off of the seal case 214 in direction 225, such as during handling of the hub assembly 200. In the initial configuration of the seal 212 shown in FIG. 4, the radially outer section 286 of the sleeve 216 is axially spaced from the intermediate section 282 of the seal case 214 by a distance 292, the intermediate section 288 of the sleeve 216 is axially spaced from the radially inner section 284 of the seal case 214 by a distance 294, and the contact portion 224 of the sleeve 216 is axially spaced by a gap 296 having a distance 298 from the stop surface 230 of the flange portion 226 of the inboard bearing cone 210. The distances 292, 294 will decrease and the gap 296 will close as the sleeve 216 contacts the spindle shoulder 236 and the seal case 214 and sleeve 216 shift toward an installation configuration during advancing of the hub assembly 200 in direction 225 onto the spindle 202 as discussed below. The radially inner section 290 has an axial length 291 sized to axially space the sleeve 216 from the seal case 214 when the sleeve 216 abuts the stop surface 230 of the inboard bearing cone 210 to provide a substantially fixed axial spacing between the sleeve 216 and the seal case 214. The substantially fixed axial distance between the sleeve 216 and the seal case 214 maintains the seal case 214 and sleeve 216 in an operative configuration until the seal case 214 and sleeve 216 arrive at a final, operative position on the spindle 202.

In FIG. 4, the inboard cone 210 has a center opening with a radially inner surface 300 that is sized to form a slip fit with the seal journal 302 of the spindle 202. The wheel hub assembly 200 has a spindle nut that is tightened down to urge the inboard cone 210 and hub body 204 associated therewith in direction 225 along the spindle 202.

Figure 5:
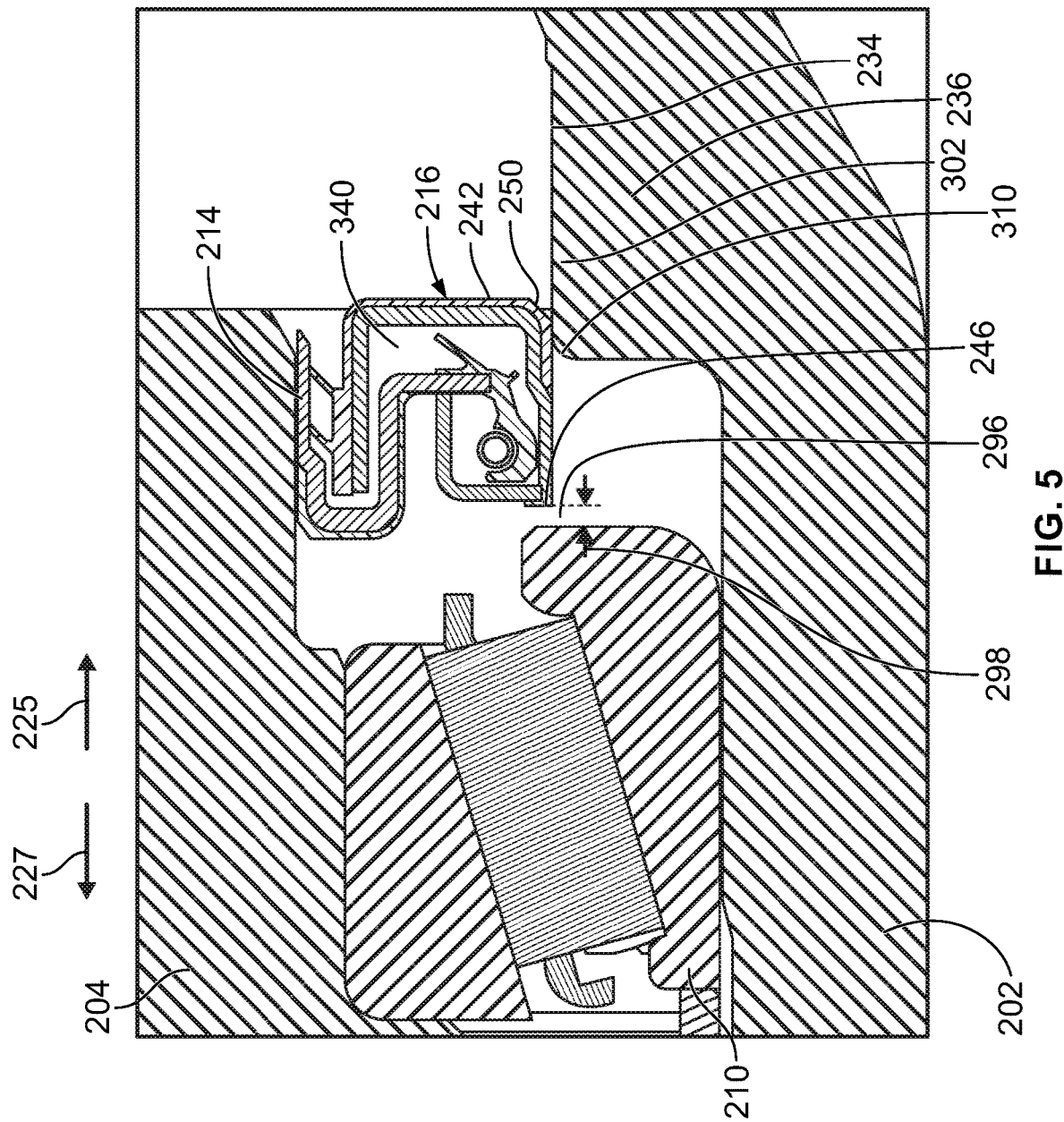
FIG. 5 is a view similar to FIG. 4 showing a leading end portion of the sleeve contacting a shoulder of the spindle seal journal.

Regarding FIG. 5, the spindle nut is tightened to urge the hub body 204 and inboard bearing cone 210 in direction 225 along the spindle 202. This brings the leading end portion 250 of the seal member 242 of the sleeve 216 into contact with the radially outer surface 234 of the seal journal 302. The seal journal 302 may include a tapered surface 310 that tapers radially outward and centers the sleeve 216 on the spindle 202 as the sleeve 216 is advanced therealong. The interference between the leading end portion 250 of the sleeve 216 and the seal journal 302 provides a reaction force in direction 227 that resists further axial movement of the sleeve 216 in direction 225 and temporarily halts axial movement of the sleeve 216 while the hub body 204 and inboard bearing cone 210 continue to be advanced axially in direction 225.

Figure 6:
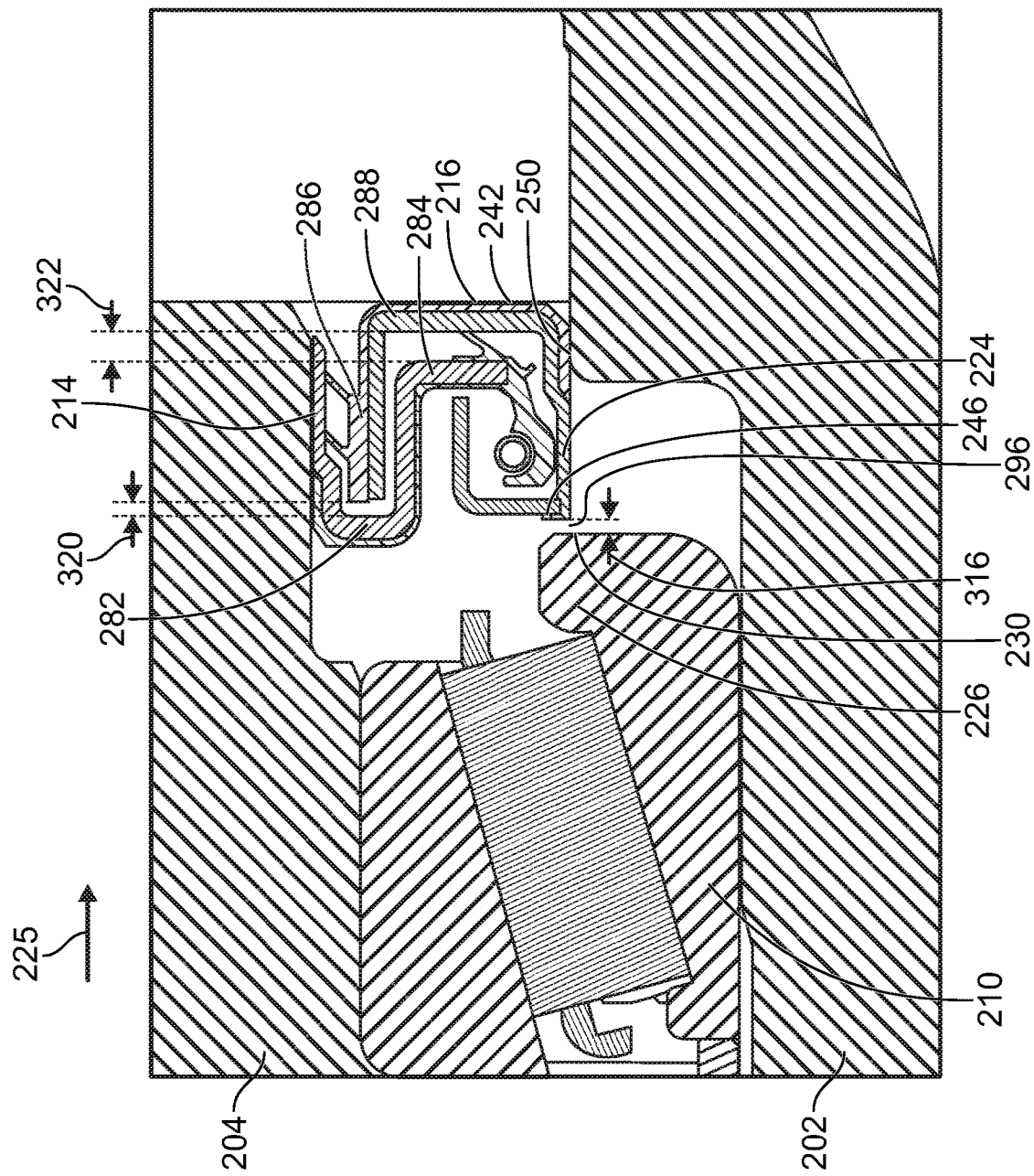
FIG. 6 is a view similar to FIG. 5 showing the hub body and inboard bearing cone mounted thereon continuing to be advanced along the spindle seal journal and the leading end portion of the sleeve engaging the shoulder of the spindle seal journal which temporarily halts movement of the sleeve along the spindle seal journal.

Regarding FIGS. 5 and 6, upon the leading end portion 250 of the sleeve 216 contacting the seal journal 236, continued advancing of the hub body 204 and inboard bearing cone 210 in direction 225 moves the seal case 214 mounted in the hub body 204 toward the now-stationary sleeve 216. The continued advancing of the seal case 214 and hub body 204 toward the sleeve 216 narrows the axial gap between the intermediate section 282 of the seal case 214 and the radially outer section 286 of the sleeve 216 to a distance 320 that is less than a distance 292. Similarly, the gap between the radially inner section 284 of the seal case 214 and the intermediate section 288 of the sleeve 216 is narrowed to a distance 322 that is less than a distance 294. Further, the gap 296 is narrowed to a distance 316.

Figure 7:
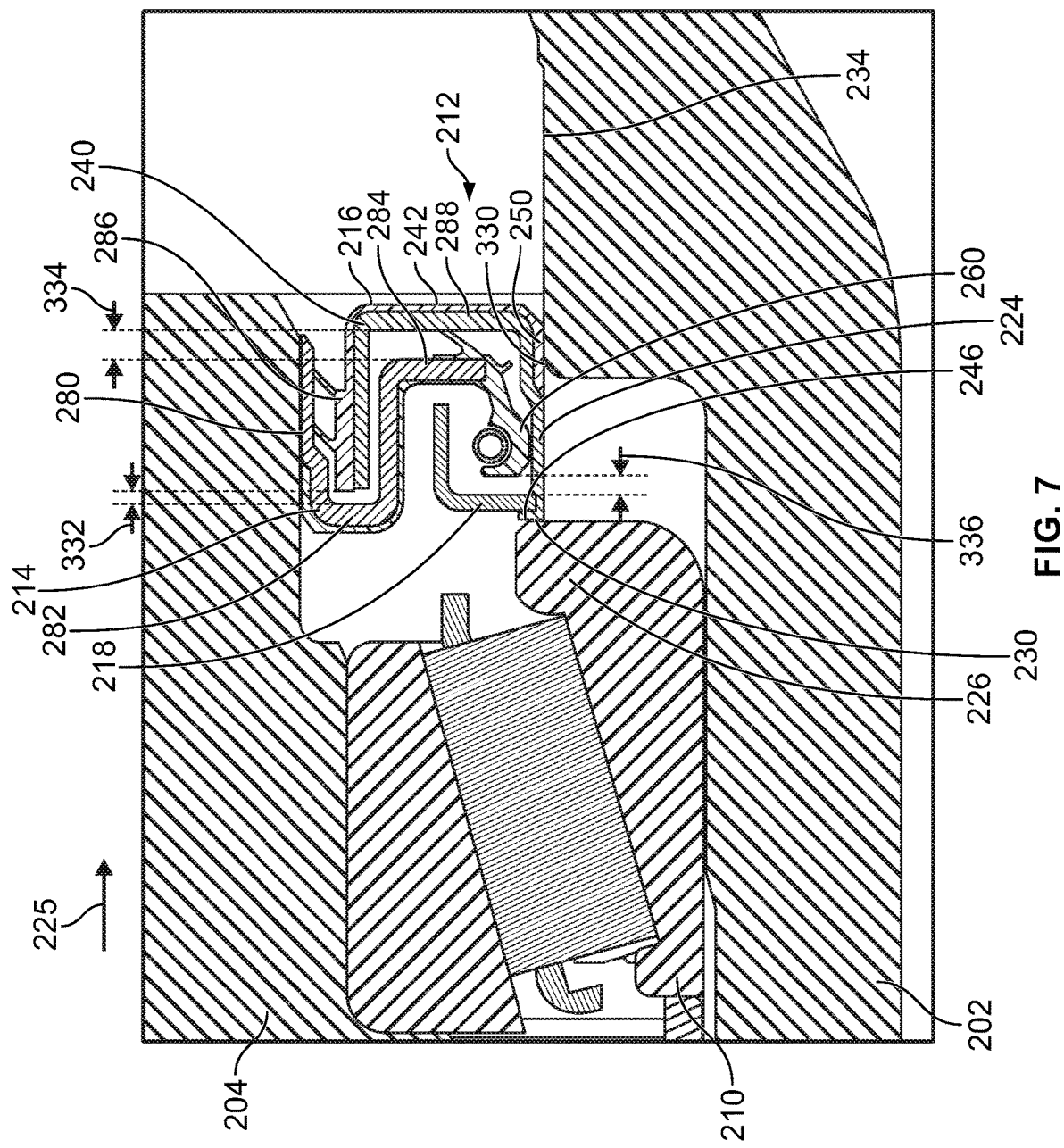
FIG. 7 is a cross-sectional view similar to FIG. 6 showing a stop surface of the inboard bearing cone flange portion abutting the contact portion of the sleeve which causes the sleeve to advance along the spindle seal journal as the hub body and inboard bearing cone mounted therein are continued to be advanced in the inboard direction along the spindle seal journal.

Regarding FIG. 7, the hub body 204 and inboard bearing cone 210 have been advanced in direction 225 to bring the stop surface 230 of the flange portion 226 into abutting contact with the surface 246 of the contact portion 224 of the sleeve 216. With the surfaces 230, 246 abutting, further advancing of the inboard bearing cone 210 in direction 225 rigidly urges the body 240 of the sleeve 216 in direction 225. The body 240 of the sleeve 216 may thereby transfer the axial forces from the inboard cone 210 to the leading end portion 250 of the seal member 242 and overcome the frictional resistance to sliding of the leading end portion 250 along the radially outer surface 234 of the seal journal 302. In one embodiment, the seal member 242 has a smooth cylindrical surface 330. In other embodiments, the surface 330 has protrusions, such as one or more ribs, that may slide along the radially outer surface 234 of the seal journal 302.

The rigid connection between the body 240 of the sleeve 216 and the flange portion 226 of the inboard cone 210 due to the abutting surfaces 230, 246, as well as the connection between the inboard bearing cone 210 and the hub body 204, provides and maintains a distance 332 between the intermediate section 282 of the seal case 214 and the distance 334 between the radially inner section 284 of the seal case 214 and the intermediate section 288 of the sleeve 216. Further, the rigid contact between surfaces 230, 246 permits the seal 212 to be advanced along the spindle 202 with a generally fixed distance 336 between the retainer 218 and the sealing portion 260 of the seal case 214. In one embodiment, the contact of the inboard bearing cone 230 and the sleeve 216 causes distance 332 to be less than distance 320 and distance 334 to be less than distance 322.

The cooperation of the flange portion 226 and the contact portion 224 of the sleeve 216 preserves the distances 332, 334, 336 as the seal 212 is advanced along in direction 225 along the spindle 202 and maintains the geometry of the seal case 214 and the sleeve 216. By maintaining the geometry of the seal case 214 and the sleeve 216, the seal case 214 and sleeve 216 are kept axially separated which reduces frictional resistance and heat produced by rotation of the seal case 214 relative to the sleeve 216 once the vehicle is placed into service. Further, maintaining the geometry between the seal case 214 and the sleeve 216 preserves the geometry of a tortuous path 340 (see FIG. 5) which improves tolerances in the seal 212. The tortuous path 340 inhibits contaminants like mud and dirt from entering the seal 212 and keeps lubricant within the seal 212. By maintaining the geometry between the seal case 214 and the sleeve 216, the width of the tortuous path 340 is kept from being wider than desired and maintains the efficacy of the seal 212.

Figure 8:
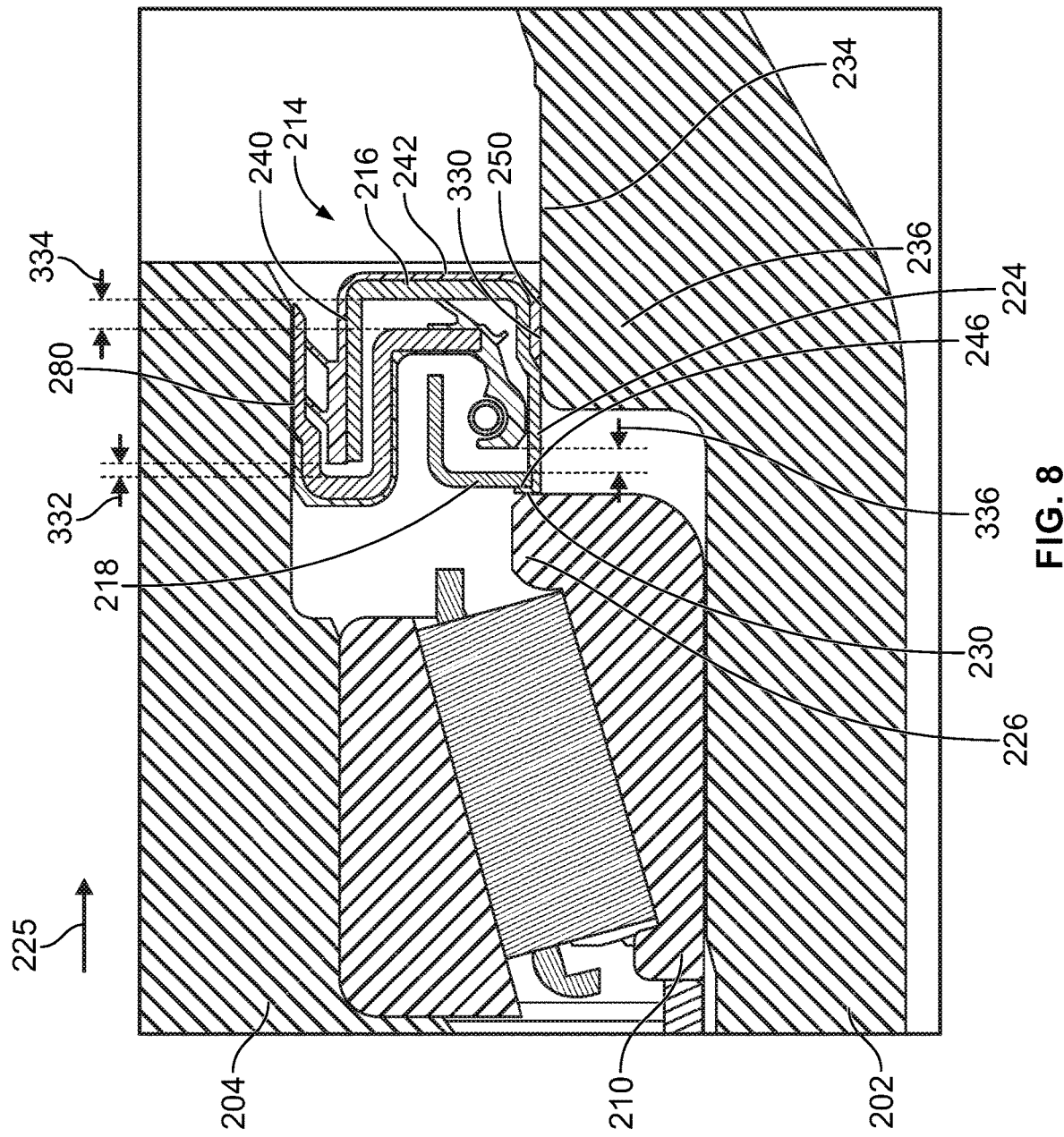
FIG. 8 is a cross-sectional view similar to FIG. 7 showing the hub body and inboard bearing cone mounted therein continuing to be advanced in the inboard direction with the flange portion of the inboard bearing cone abutting the sleeve.

Regarding FIG. 8, the hub body 204 and inboard bearing cone 210 are continued to be advanced in direction 225 while the flange portion 226 of the inboard cone 210 contacts the contact portion 224 of the sleeve 216 and urges the sleeve 216 in direction 225 along the radially outer surface 234 of the seal journal 302. The rigidity of the bodies 240, 252 of the sleeve 216 and seal case 214, and matching axial movement of the inboard bearing cone 210 and hub body 204, maintains the distances 332, 334, 336 as the seal case 214 and sleeve 216 are advanced along the spindle 202.

Figure 9:
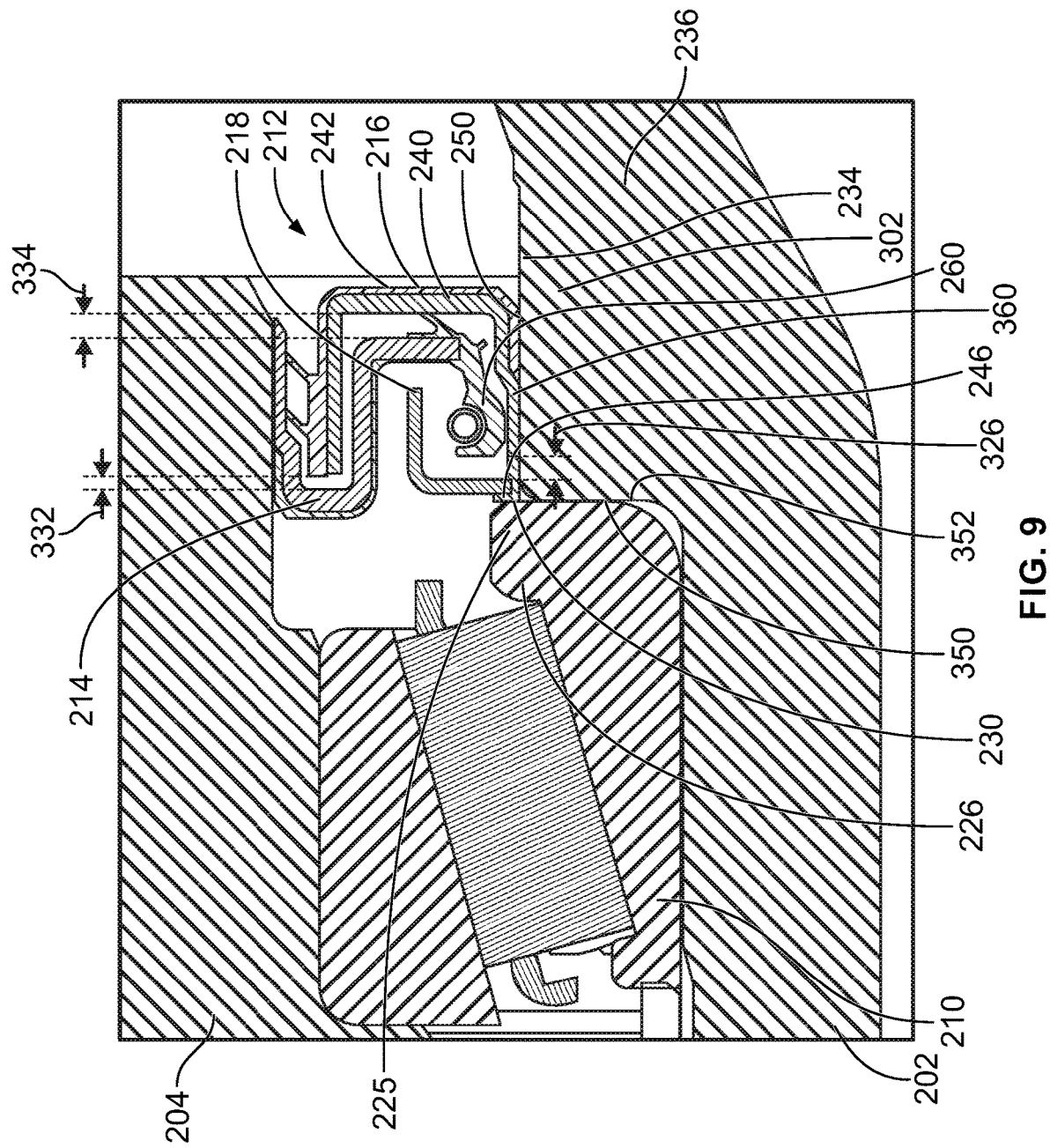
FIG. 9 is a cross-sectional view similar to FIG. 8 showing the inboard bearing cone seated against the shoulder of the spindle seal journal and the sleeve at an operative position on the spindle seal journal, wherein the sleeve includes a radially inner portion engaging a radially outer surface of the spindle seal journal.

Regarding FIG. 9, the hub body 204 has been fully advanced in direction 225 to an installed position which seats a surface 350 of the inboard bearing cone 210 against a radial surface 352 of the spindle shoulder 236. With the inboard cone 210 seated against the spindle shoulder 236, the flange portion 226 of the inboard bearing cone 210 extends radially outward beyond the radially outer surface 234 of the spindle shoulder 236. In one embodiment, the stop surface 230 of the flange portion 226 is contiguous with the surface 350 of the inboard cone 210. In other embodiments, the stop surface 230 and the surface 350 may be discrete surfaces, such as separated by a gap.

In FIG. 9, the seal 212 is shown in an installed configuration wherein the distances 332, 334, 336 between the seal case 214, sleeve 216, and retainer 218 are substantially the same as upon the inboard bearing cone flange portion 226 contacting the sleeve contact portion 224 (see FIG. 7). In the installed configuration, the leading end portion 250 of the sleeve 216 as well as a portion 360 of the body 240 are in contact with the radially outer surface 234 of the seal journal 302. The seal member 242 may be made of a polymeric material, such as rubber, that forms a seal with the inboard seal journal 302. The body 240 may be made of a metallic material that provides rigidity and withstands tension from the interference fit with the seal journal 302 to keep the sleeve 216 fixed against axial and rotational movement on the seal journal 302. The body 240 transmits the heat generated by the rotating contact between the body 240 and the sealing portion 260 of the seal case 214 directly to the spindle 202, which may be a larger, metal component that operates as a heat sink. Further, the portion 360 of the body 240 that is engaged with the seal journal 302 has an inner diameter sized to be in interference with the shoulder 236. The portion 360 of the body 240 thereby provides a rigid connection with and along the shoulder 236 of the spindle 202. Further, the metal of the body portion 360 has a similar radial thermal expansion as the seal journal 302 so that the metal remains tightly engaged with the seal journal 302.

Figure 10:
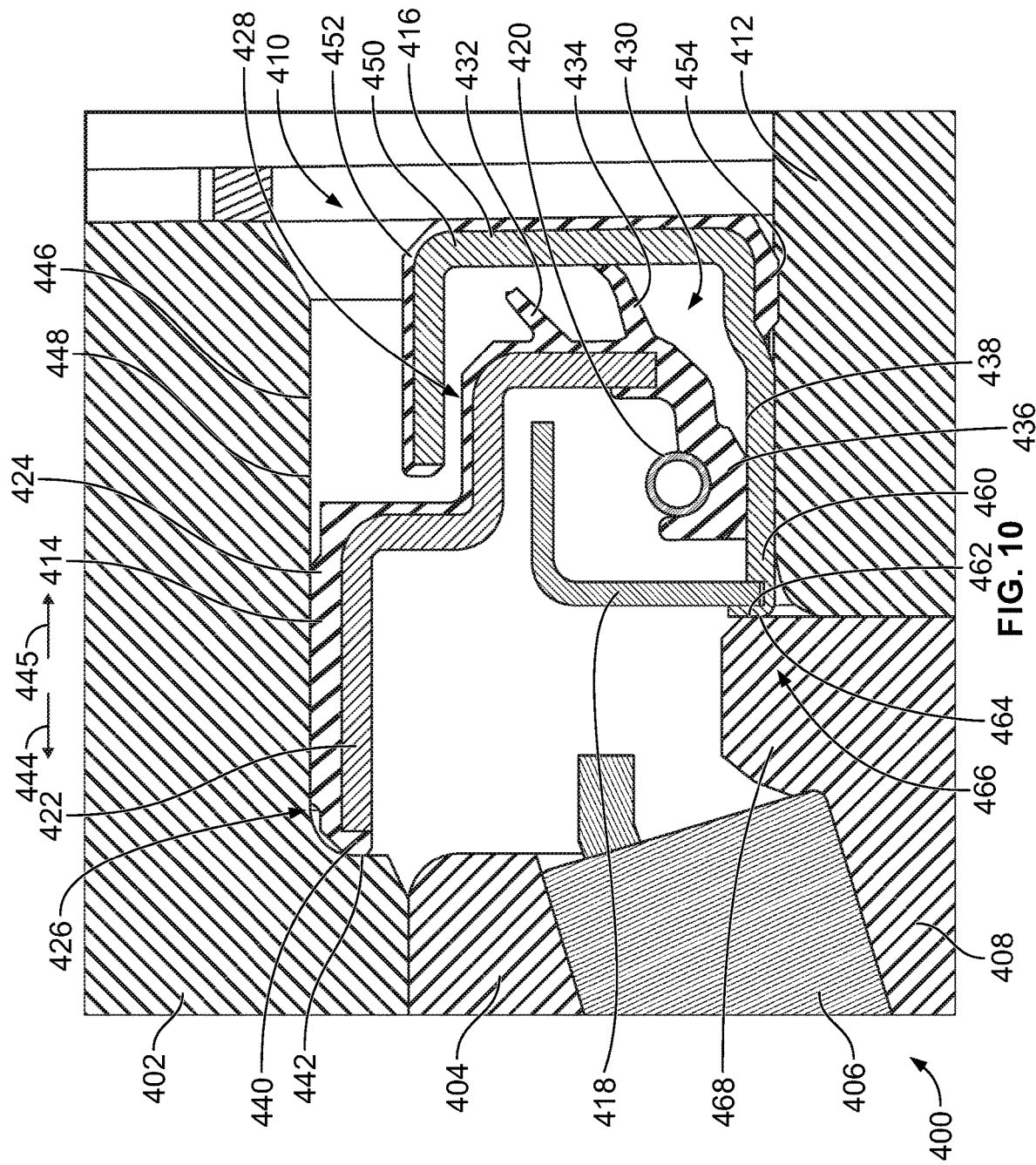
FIG. 10 is a cross-sectional view of another wheel hub assembly, the wheel hub assembly including an inboard bearing cone having a flange portion abutting a contact portion of a sleeve of the wheel hub assembly.

Regarding FIG. 10, a wheel hub assembly 400 is provided that is similar in many respects to the wheel hub assemblies 10, 200 discussed above such that differences will be highlighted. The wheel hub assembly 400 includes a hub body 402, an inboard bearing cup 404, a plurality of roller bearings 406, an inboard bearing cone 408, and a seal 410. The wheel hub assembly 400 is shown mounted on a spindle seal journal 412. The seal 410 includes a seal case 414, a sleeve 416, a retainer 418, and a garter spring 420.

The seal case 414 includes a body 422 made of a rigid material, such as a metal, and a sealing member 424 that may be made of a polymeric material, such as an elastomeric material, such as rubber. The seal case 414 includes a radially outer section 426, an intermediate section 428, and a radially inner section 430. The sealing member 424 may extend from the radially outer section 426 to the radially inner section 430. The sealing member 424 includes walls 432, 434 and a sealing portion 436. The garter spring 420 holds the sealing portion 436 against a radially outer surface 438 of the sleeve 416.

The sealing member 424 includes a seating portion 440 that bottoms out against a radial surface 442 of the hub body 402 when the seal case 414 is pressed in direction 444 into a hub bore 446 of the hub 402. Further, the sealing member 424 extends axially along and forms the interface between the seal case 414 and the radially inner surface 448 of the hub 402. In one embodiment, the sealing member 424 is made of a material with a higher resistance to conductive heat transfer than the body 422, such as rubber when the body 422 is made of steel, such that the sealing member 424 resists heat transfer into the seal 410. For example, the material of the sealing member 424 may limit the absorption of heat from a brake associated with the hub body 402. The thermal insulation provided by the sealing member 424 may reduce operating temperatures within the seal 410 and prolong seal life.

Regarding FIG. 10, the sleeve 416 includes a body 450 made of a rigid material, such as a metal, and a sealing member 452 joined thereto. The body 450 and sealing member 452 may be joined using a process that involves applying a pretreatment to the body 450, coating the pretreated body 450 with rubber (for example), and co-vulcanizing the pretreatment and rubber during molding of the sealing member 452 on the body 450. The seal case 414 may be manufactured in a manner similar to the sleeve 416.

The sealing member 452 may be made of a polymer material, such as an elastomeric material such as rubber, and includes a leading end portion 454 that contacts the spindle seal journal 412 as the wheel hub assembly 400 is advanced in inboard direction 445 along the spindle seal journal 412. Further, the body 450 includes a contact portion 460 having a surface 462 that abuts a stop surface 464 of a stop 466 formed by a flange portion 468 of the inboard bearing cone 408. The abutting contact between the contact portion 460 of the sleeve 416 and the flange portion 468 of the inboard bearing cone 408 provides a rigid support for the sleeve 416 as the hub assembly 400 is advanced in inboard axial direction 445 along the spindle seal journal 412.

Figure 11:
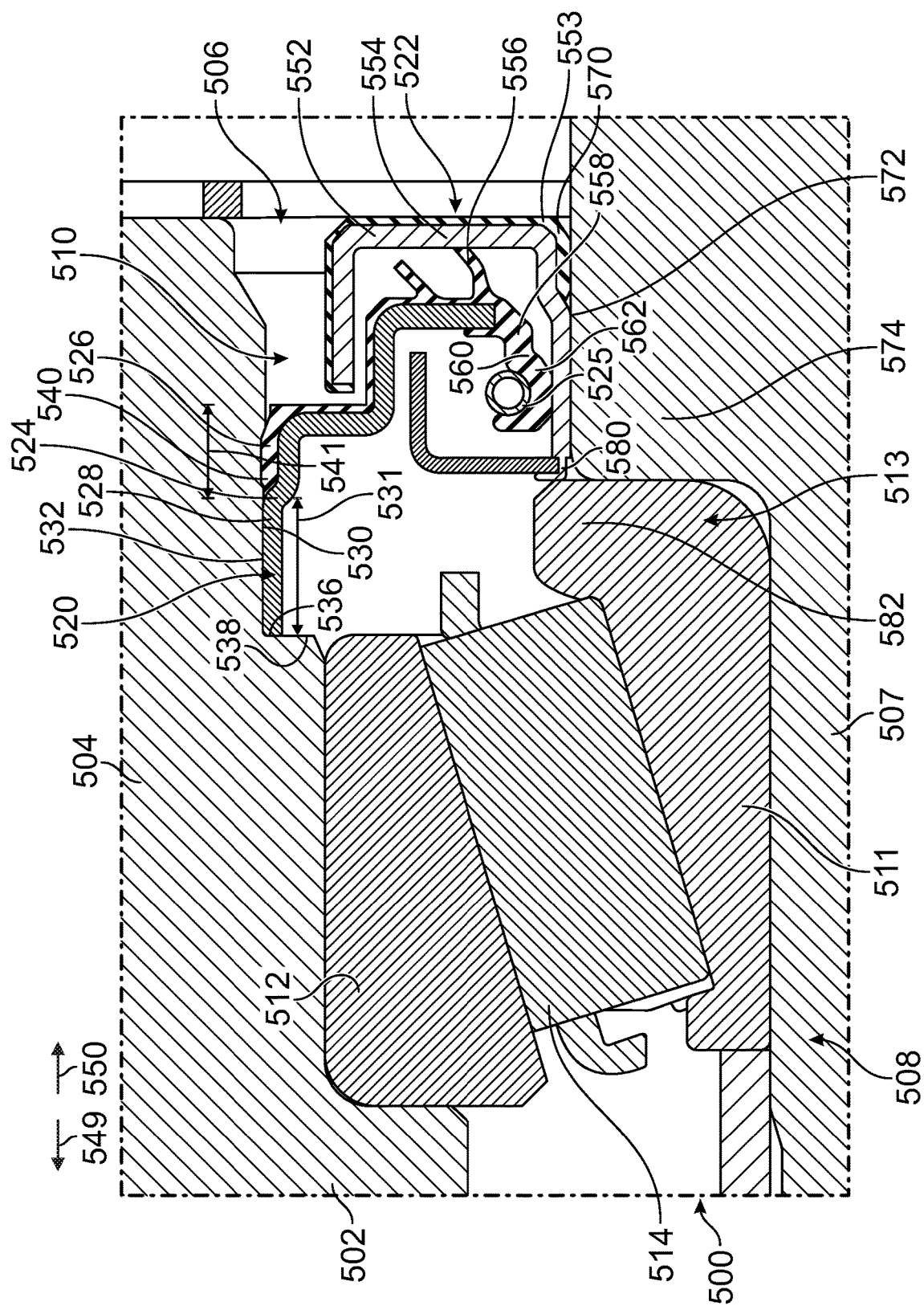
FIG. 11 is a cross-sectional view of a portion of another wheel hub assembly, the wheel hub assembly including a seal case having a metal outer diameter that is engaged with an inner diameter of a wheel hub of the wheel hub assembly.

Regarding FIG. 11, a portion of a wheel hub assembly 500 is provided that is similar in many respects to the wheel hub assemblies discussed above such that the differences will be highlighted. The wheel hub assembly 500 includes a wheel hub 502 having a hub body 504 with an opening 506 that receives a bearing assembly 508 and a seal 510. The bearing assembly 508 and seal 510 have central openings sized to receive a spindle 507 of a vehicle. The bearing assembly 508 includes a bearing cup 511, a bearing cone 512, and roller bearings 514 therebetween. The seal 510 includes a seal case 520, a sleeve 522, and a garter spring 525. The bearing assembly 508 includes a stop 513 configured to urge the sleeve 522 along the spindle 507 as the bearing assembly 508 and wheel hub 502 are advanced along the spindle 507. The stop 513 may include, for example, a flange portion 582 of the bearing cone 512. In another embodiment, the stop 513 of the bearing assembly 508 includes a ring distinct from the bearing cone 512 that is sandwiched between the bearing cone 512 and a seal journal 574 of the spindle 507.

The seal case 520 has a body 524 that may be made of a metallic material, such as steel or aluminum, and a sealing member 526 that may be made of an elastomeric material, such as rubber. The sealing member 526 may be secured to the body 524 by way of an adhesive, a chemical bond, and/or interlocking structures as some examples. The body 524 includes a radially outer portion 528 having a radially outer surface 530 that extends an axial distance 531 and forms at least a portion of the outer diameter of the seal case 520. The radially outer surface 530 of the seal case 524 may have a press-fit engagement with a radially inner surface 532 of the hub body 504 that defines an inner diameter of the hub body opening 506. The radially outer portion 528 of the body 524 includes an end 536 abutting a radial surface 538 of the hub body 504 once the seal case 520 has been pressed into and seated in the opening 506 of the hub body 504 in direction 549.

The sealing member 526 includes a radially outer portion 540 having a radially outer surface that engages the radially inner surface 532 of the hub body 504. The radially outer portion 540 extends an axial distance 541 that is shorter than axial distance 531 and may form a portion of the outer diameter of the seal case 520. Because the radially outer portion 540 of the sealing member 526 extends less than the entire axial extent of the outer diameter of the seal case 520, the sealing member 526 provides less frictional resistance to removal of the seal case 520 in direction 550 such as during maintenance of the wheel hub assembly 500.

Regarding FIG. 11, the sleeve 522 includes a body 552 that may be made of a metallic material, such as steel or aluminum, and a sealing member 553 that may be made of an elastomeric material, such as rubber. The sealing member 526 of the seal case 520 may include one or more walls 556 and a radially inner portion 558 with a sealing portion 560 that may include a main sealing lip 562. The garter spring 525 urges the main sealing lip 562 against a radially outer surface of the body 552 of the sleeve 522. The sealing member 553 may have a radially inner portion 570 that engages a radially outer surface 572 of the seal journal 574 of the spindle 507. The body 552 of the sleeve 522 includes a contact portion 580 for contacting the flange portion 582 of the stop 513 of the bearing cone 512.

Figure 12:
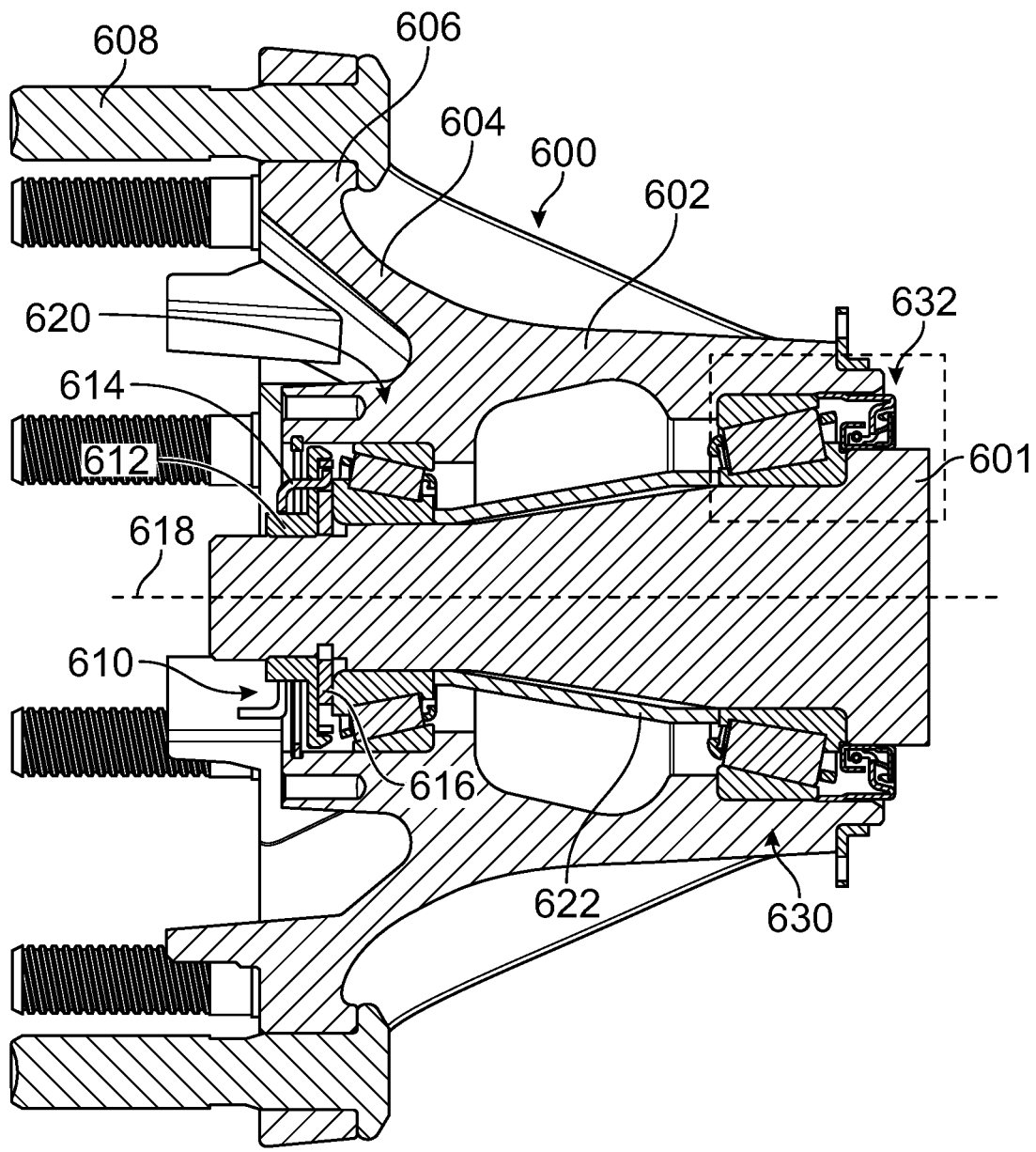
FIG. 12 is a cross-sectional view of another wheel hub assembly.
Figure 13:
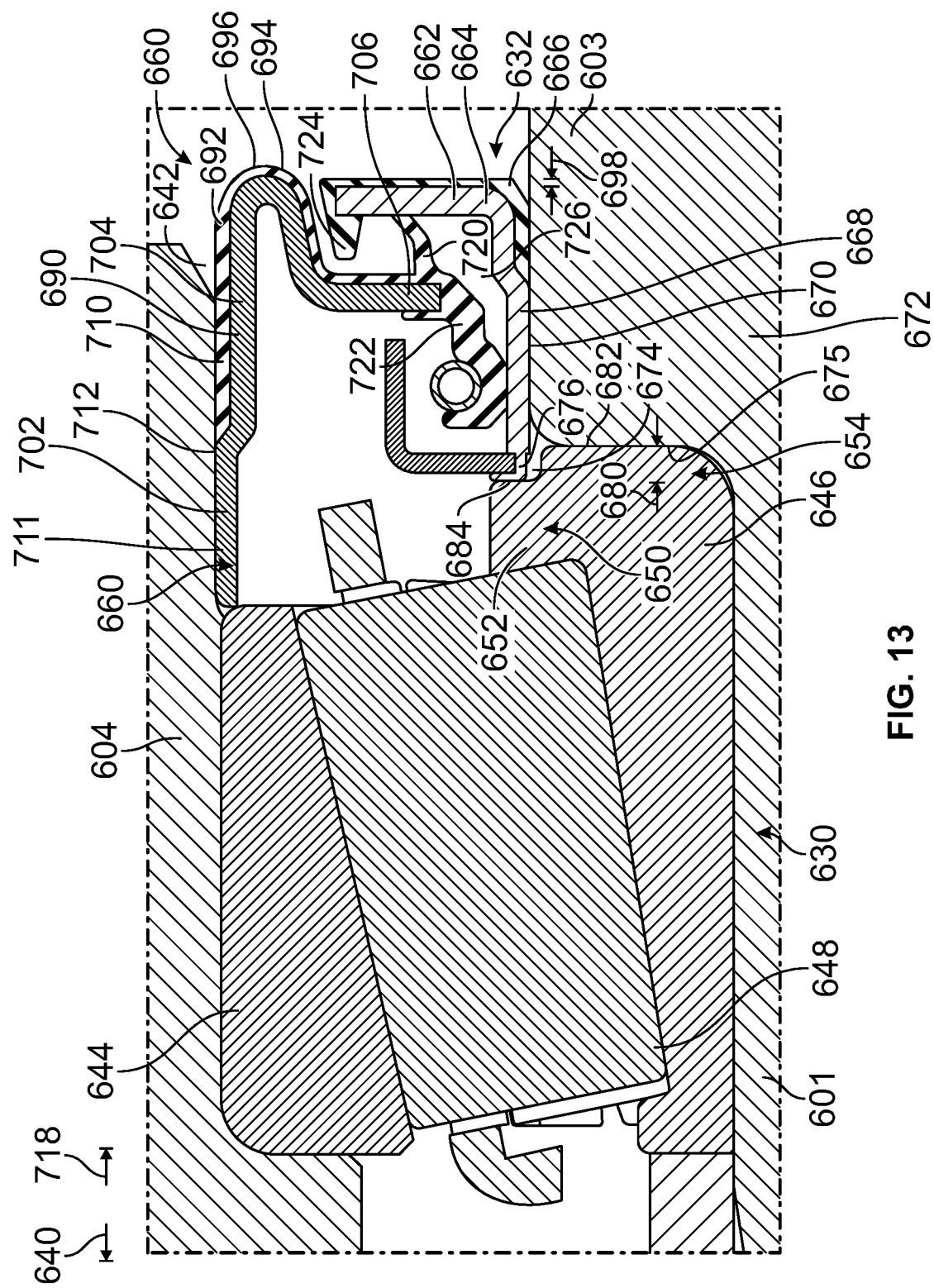
FIG. 13 is a portion of the wheel hub assembly shown in the dashed box of FIG. 12, the wheel hub assembly including a bearing cone having a flange portion that abuts a contact portion of the sleeve, the bearing cone having a recess that receives the contact portion of the sleeve and permits the sleeve to overlap the bearing cone in the radial direction.

Regarding FIGS. 12 and 13, a wheel hub assembly 600 is provided that is similar in many respects to the wheel hub assemblies discussed above such that differences will be highlighted. The wheel hub assembly 600 may be used to connect a wheel to a steer spindle 601. The wheel hub assembly 600 includes a wheel hub 602 having a hub body 604 with a flange 606 and studs 608 connected thereto. The wheel hub assembly 600 includes a retainer assembly 610 having a spindle nut 612, a snap ring retainer 614, and a spindle nut washer 616 that rotatably capture the wheel hub 602 on the spindle 601 so that the wheel hub 602 may rotate around a central axis 618. The wheel hub assembly 600 further includes an outboard bearing assembly 620, a spacer 622, an inboard bearing assembly 630, and an inboard seal 632.

Regarding FIG. 13, the inboard bearing assembly 630 may be mounted in the opening 642 of the hub body 604 by pressing the inboard bearing assembly 630 in direction 640 into the opening 642 of the hub body 604. The inboard bearing assembly 630 includes a bearing cup 644, a bearing cone 646, and roller bearings 648 therebetween. The inboard bearing assembly 630 includes a stop 650, such as a flange portion 652 of the bearing cone 646, and an offset portion 654.

The seal 632 includes a seal case 660 and a sleeve 662. The sleeve 662 includes a body 664, which may be made of a metallic material, and a sealing member 666, which may be made of an elastomeric material. The body 664 has a radially inner portion 668 having a press-fit engagement with a radially outer surface 670 of a seal journal 672 of the spindle 601.

Regarding FIG. 13, the offset portion 654 of the bearing cone 646 permits a contact portion 676 of the sleeve body 654 to nest partially in the bearing cone 646 and extend a distance 680 axially outboard beyond a radial surface 682 of the seal journal 672. The contact portion 676 of the sleeve body 654 and the bearing cone 646 thereby overlap in a radial direction. The offset portion 654 provides an axially compact assembly of the sleeve 662 and bearing cone 646 which may be advantageous in some applications. In one embodiment, the offset portion 654 includes a notch or recess 674 forming a step-shaped radially outer shoulder of the bearing cone 646. For example, the recess 674 may have an annular shape and extends axially from an inboard radial surface 675 of the bearing cone 646. The flange portion 652 of the bearing cone 646 includes a stop surface 684 against which the contact portion 676 of the sleeve body 664 seats.

The seal case 660 includes a body 690, which may be made of a metallic material, and a sealing member 692, which may be made of an elastomeric material. The sealing member 692 of the seal case 660 includes one or more walls 720 and a sealing portion 722 while the sealing member 666 includes one or more walls 724 to form a tortuous path 726 of the seal 632.

The seal case 662 has an axial protrusion 694 extending inboard an axial distance 698 beyond an inboard surface 700 of the sleeve 662. Because the axial protrusion 694 extends axially inboard beyond the inboard surface 700 of the sleeve 662, the axial protrusion 694 may support the wheel hub assembly 600 against a surface when the wheel hub assembly 600 is stacked on the surface for transport or storage.

In one embodiment, the body 690 has a radially outer portion 702, an intermediate portion 704 that may include a bend 705 and a radially inner portion 706. The body 690 may be made of a metallic material, such as steel or aluminum, and is configured to withstand the weight of the wheel hub assembly 600 when the wheel hub assembly 600 is stacked vertically and an inboard surface 696 of the axial protrusion 694 rests on a supporting surface. The seal case 660, rather than the sleeve 662, supports the weight of the wheel hub body 604 and other components of the stacked wheel hub assembly 600. So configured, the interface between the seal case 660 and sleeve 662 is kept from becoming jammed together or otherwise compromised.

The body 690 of the seal case 660 includes a radially outer portion 711 engaged with a radially inner surface 712 of the wheel hub body 604 and the sealing member 692 includes a radially outer portion 710 engaged with the radially inner surface 712 of the wheel hub body 604. In one embodiment, the body 690 is steel or aluminum and the sealing member 692 is rubber. The pull-out force needed to remove the seal case 660 for a given application may be reduced by having a shorter axial extent of the radially outer portion 710 of the sealing member 692 or increased by having a longer axial extent of the radially outer portion 710 of the sealing member 692.

Figure 14:
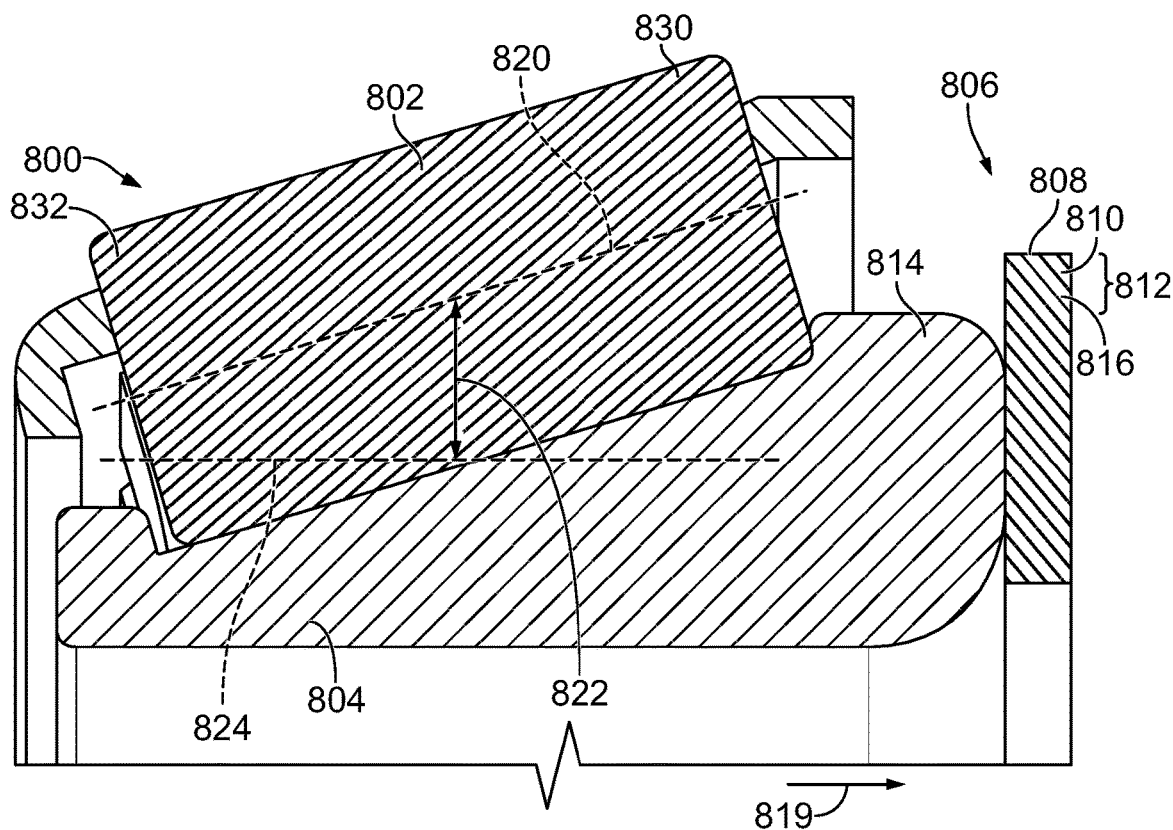
FIG. 14 is a cross-sectional view of a portion of another bearing assembly showing a stop of the bearing assembly that includes a washer distinct from a cone of the bearing assembly.

Regarding FIG. 14, a portion of another bearing assembly 800 is provided that is similar in many respects to the bearing assemblies discussed above such that differences will be highlighted. The bearing assembly 800 is shown without a bearing cup for clarity. The bearing assembly 800 includes roller bearings 802, a bearing cone 804, and a stop 806. The stop 806 includes a washer 808 that is distinct from the bearing cone 804. The washer 808 has a radially outer portion 810 extending radially a distance 812 beyond a flange portion 814 of the cone 804. The washer 808 has a stop surface portion 816 configured to contact a sleeve of a seal assembly on a vehicle spindle and urge the sleeve along the vehicle spindle with inboard movement of the bearing assembly 800 in direction 819.

Regarding FIG. 14, the roller bearings 802 have a central axis 820 and are inclined at an angle 822 relative to an axis 824 parallel to an axis of rotation of the bearing cup and roller bearings 802 around the bearing cone. The roller bearings 802 have inboard raised portions 830 and outboard lowered portions 832.

Figure 15:
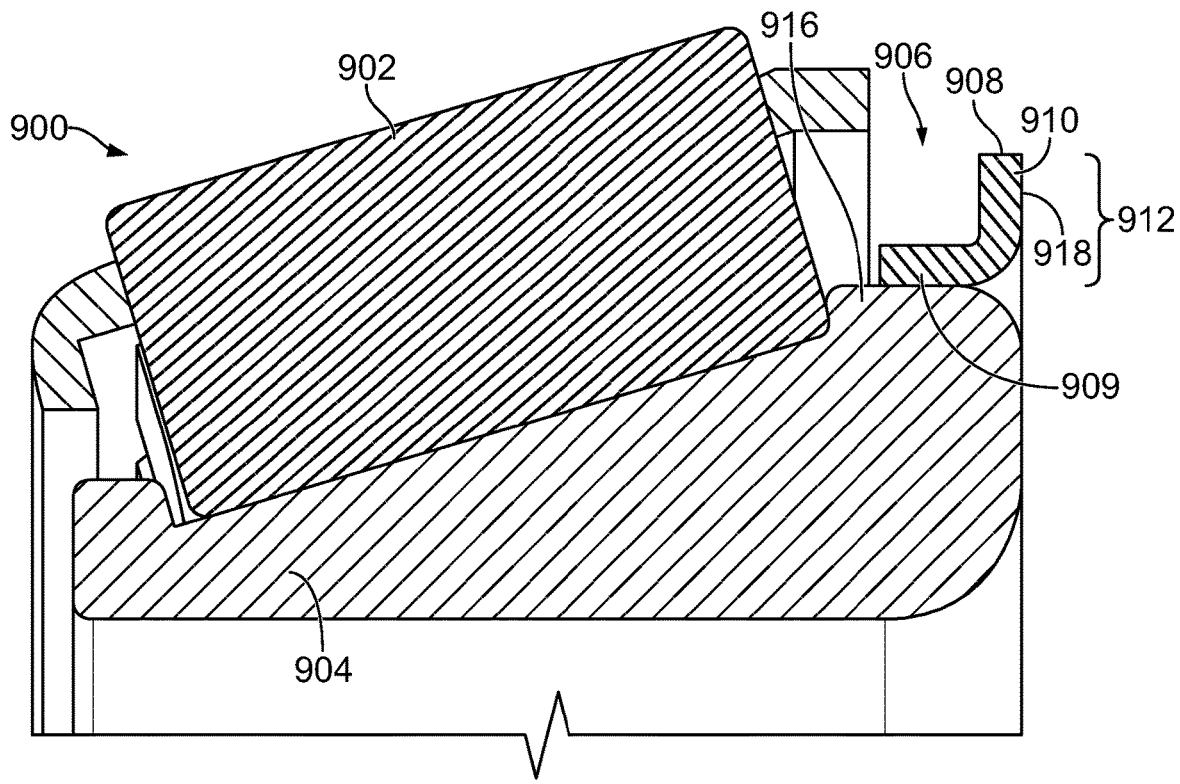
FIG. 15 is a cross-sectional view of a portion of another bearing assembly showing a stop of the bearing assembly that includes an L-cup pressed onto a cone of the bearing assembly.

Regarding FIG. 15, a portion of another bearing assembly 900 is provided that is similar in many respects to the bearing assemblies discussed above such that the differences will be highlighted. The bearing assembly 900 is shown without a bearing cup for clarity. The bearing assembly 900 includes roller bearings 902, a bearing cone 904, and a stop 906. The stop 906 includes a ring 908 mounted to the bearing cone 904, such as by pressing the ring 908 onto the bearing cone 904. The bearing cone 904 includes a sleeve portion 909 and a flange portion 910 that form an L-shaped cross section as shown in FIG. 15. The flange portion 910 extends radially a distance 912 beyond a flange portion 916 of the cone 904. The flange portion 910 of the ring 908 has a stop surface portion 918 configured to contact a sleeve of a seal assembly on a vehicle spindle and urge the sleeve along the vehicle spindle with inboard movement of the bearing assembly 900.

While there have been illustrated and described particular embodiments of the present invention, it will be appreciated that numerous changes and modifications will occur to those skilled in the art, and it is intended for the present invention to cover all those changes and modifications which fall within the scope of the appended claims. For example, it will be appreciated that various features of the wheel hub assemblies discussed above, including the seals and bearing assemblies, may be utilized in variety of applications such as commercial vehicle wheel-ends designed for axles having TP, FF, FL, TN, and R designations as described by SAE standard J2475. Further, it is intended that the phrase "at least one of" as used herein be interpreted in the disjunctive sense. For example, the phrase "at least one of A and B" is intended to encompass A, B, or both A and B.

What is claimed is:

1. A wheel hub assembly comprising:
    a hub body having an outboard end portion and an inboard end portion;
    a bearing assembly and a seal mounted to the hub body, the seal inboard of the bearing assembly;
    wherein the bearing assembly includes an outer ring mounted to the hub body, an inner ring, and a plurality of bearings that permit the outer ring to rotate relative to the inner ring;
    wherein the inner ring includes a flange portion, a recess, and an offset portion inboard of the flange portion;
    the seal including a seal case and a sleeve, the hub body and seal case being rotatable relative to the sleeve;
    the sleeve having a central opening to receive a vehicle spindle and configured to form an interference fit with a seal journal of the vehicle spindle;
    the sleeve having a contact portion for extending into the recess and contacting the flange portion of the inner ring;
    a stop of the bearing assembly comprising the flange portion of the inner ring, the stop configured to resist movement of the contact portion of the sleeve in the recess of the inner ring toward the outboard end portion of the hub body as the hub body, bearing assembly, and seal are advanced together in an inboard direction along the vehicle spindle; and the offset portion of the inner ring having an outer diameter that is less than an outer diameter of the seal journal of the vehicle spindle.

2. The wheel hub assembly of claim 1 wherein the hub body and seal case are rotatable about an axis relative to the sleeve; and wherein the stop and the sleeve overlap in an axial direction to resist movement of the sleeve toward the outboard end portion of the hub body.

3. The wheel hub assembly of claim 1 wherein the hub body and seal case are rotatable around a central axis relative to the sleeve; and wherein the seal case and the stop have a fixed axial spacing therebetween so that the seal case and stop have the fixed axial spacing therebetween as the hub body, bearing assembly, and seal are advanced in the inboard direction along a vehicle spindle.

4. The wheel hub assembly of claim 3 wherein the sleeve is shiftable in an outboard direction from a first position relative to the seal case to a second position relative to the seal case upon the sleeve engaging a vehicle spindle with advancing of the hub body, bearing assembly, and seal in the inboard direction; and wherein the stop keeps the sleeve in the second position relative to the seal case and resists movement of the sleeve toward the hub body outboard end portion as the hub body, bearing assembly, and seal are advanced in an inboard direction along a vehicle spindle.

5. The wheel hub assembly of claim 1 wherein the hub body has a unitary, one piece construction, the hub body including a flange, a central through opening, and a tubular side wall extending about the central opening;

studs extending from the hub body flange; and wherein the bearing assembly and the seal are mounted in the central opening radially inward of the tubular side wall.

6. The wheel hub assembly of claim 1 wherein the stop includes a radially extending surface; and wherein the sleeve includes an outboard end surface facing the radially extending surface of the stop.

7. The wheel hub assembly of claim 1 wherein the sleeve includes a metallic body comprising a radially inner, annular portion having the central opening for receiving the vehicle spindle, the metallic body having a radially inner surface configured to contact the vehicle spindle and permit heat transfer thereto.

8. The wheel hub assembly of claim 1 wherein the seal case includes a metallic body and a sealing member joined to the metallic body, the sealing member including a sealing portion that contacts the sleeve as the seal case rotates relative to the sleeve.

9. The wheel hub assembly of claim 8 wherein the hub body includes a central through opening and the seal case is in the central through opening; and wherein the metallic body and sealing member each include a radially outer portion engaged with a radially inner surface of the hub body.

10. The wheel hub assembly of claim 1 wherein the sleeve includes a radially inner section having the central opening to receive the vehicle spindle;

wherein the seal case includes a radially outer section engaged with the hub and a radially inner section comprising a lip that contacts a radially outer surface of the radially inner section of the sleeve; and wherein the radially inner section of the sleeve includes the contact portion to contact the stop of the bearing assembly.

11. The wheel hub assembly of claim 1 further comprising:

a second bearing assembly having a second center opening to receive the vehicle spindle;

a spacer separating the bearing assemblies; and a spindle nut configured to engage the vehicle spindle and secure the bearing assemblies along the vehicle spindle.

12. An apparatus for a wheel hub assembly, the apparatus comprising:

a cassette seal including:
a seal case;
a sleeve having a central opening sized to form an interference fit with a vehicle spindle;
the sleeve having a contact portion; and
the seal case rotatable relative to the sleeve about a central axis; and a bearing assembly having an inboard side and an outboard side, the bearing assembly comprising:
an inner ring comprising a flange portion, a recess adjacent the flange portion to receive the contact portion of the sleeve, and an offset portion inboard of the flange portion;
an outer ring;
a plurality of bearings configured to permit the outer ring to rotate about the inner ring;
the flange portion of the inner ring configured to inhibit outboard axial movement of the contact portion of the sleeve received in the recess beyond a predetermined axial position as the bearing assembly and cassette seal are advanced in an inboard axial direction along the vehicle spindle; and
the offset portion of the inner ring configured to be spaced radially inward from the contact portion of the sleeve upon the sleeve forming the interference fit with the vehicle spindle.

13. The apparatus of claim 12 wherein the flange portion of the inner ring has an outer diameter and the central opening of the sleeve has an inner diameter smaller than the outer diameter of the inner ring flange portion.

14. The apparatus of claim 12 wherein the sleeve includes a metallic body including the contact portion.

15. The apparatus of claim 14 wherein the metallic body includes a radially inner surface extending around the central opening of the sleeve to form the interference fit with the vehicle spindle.

16. The apparatus of claim 15 wherein the seal case includes a seal portion configured to contact a radially outer surface of the metallic body of the sleeve adjacent the radially inner surface of the sleeve.

17. The apparatus of claim 12 wherein the seal case includes an annular metallic body extending about the central axis of the seal case and an polymeric seal member joined to the metallic body, the metallic body and the polymeric seal member each including a radially outer portion configured to engage a radial surface of a wheel hub.

18. The apparatus of claim 12 wherein the seal case comprises:

a radially outer portion to engage a wheel hub;
a radially inner portion including a sealing lip that contacts the sleeve; and
an intermediate portion extending axially inboard beyond the sleeve.

19. A wheel hub assembly comprising:
a hub body rotatable around a central axis;
a bearing assembly;
a seal including a seal case and a sleeve,
the seal case mounted to the hub body;

the sleeve permitting the seal case to rotate relative to the sleeve, the sleeve comprising a metallic body and a polymeric sealing member joined to the metallic body;
a radially inner portion of the metallic body of the sleeve including a central opening to receive a vehicle spindle and configured to form an interference fit therewith;
a radially inner surface of the radially inner portion of the metallic body of the sleeve configured to directly contact the vehicle spindle and transfer heat thereto;
a radially inner surface of the polymeric sealing member configured to directly contact the vehicle spindle inboard of the radially inner surface of the radially inner portion of the metallic body;
a radially outer surface of the radially inner portion of the metallic body having at least a portion thereof aligned in a radial direction with the radially inner surface of the metallic body; and
a sealing portion of the seal case configured to engage the radially outer surface of the radially inner portion of the metallic body outboard of the radially inner surface of the polymeric sealing member.

20. The wheel hub assembly of claim 19 further comprising an annular biasing member configured to keep the sealing portion of the seal case contacting the radially outer surface of the radially inner portion of the metallic body of the sleeve.

21. The wheel hub assembly of claim 19 wherein the hub body includes an inboard end portion and an outboard end portion;
wherein the bearing assembly includes a stop configured to contact the metallic body of the sleeve and inhibit outboard movement of the sleeve beyond a predetermined position relative to the hub body as the hub body, bearing assembly, and seal are advanced in an inboard direction along a vehicle spindle.

22. The wheel hub assembly of claim 21 wherein the bearing assembly includes an inner ring, an outer ring, and a plurality of bearings that permit the outer ring to rotate around the inner ring; and
wherein the stop includes a flange portion of the inner ring.

23. The wheel hub assembly of claim 19 wherein the sleeve includes a radially outer portion extending into a recess of the seal case and an intermediate portion between the radially outer portion and the radially inner portion of the metallic body; and
wherein the intermediate portion includes a portion of the metallic body and a portion of the polymeric sealing member.

24. The wheel hub assembly of claim 19 wherein the hub body includes an outboard end portion and an inboard end portion;
wherein the bearing assembly is outboard of the seal case; and
wherein the seal case includes an intermediate portion extending inboard and protruding beyond the sleeve.

25. A method of installing a preassembled wheel hub assembly on a vehicle spindle of a vehicle, the preassembled wheel hub assembly including a wheel hub body, a bearing assembly, and a seal, the seal comprising a sleeve for mounting on the vehicle spindle and a seal case rotatable about the sleeve, the method comprising:
aligning openings of the bearing assembly and the sleeve of the preassembled wheel assembly with the vehicle spindle;
advancing the preassembled wheel hub assembly in an axial, inboard direction along the vehicle spindle to engage a radially inner surface of the sleeve with a radially outer surface of the vehicle spindle and abut a flange portion of an inner ring of the bearing assembly with a contact portion of the sleeve in a recess of the inner ring adjacent the flange portion; and
urging the sleeve along the vehicle spindle while the radially inner surface of the sleeve is engaged with the radially outer surface of the vehicle spindle via contact between the flange portion of the inner ring of the bearing assembly and the contact portion of the sleeve in the recess of the inner ring with continued advancing of the wheel hub body and bearing assembly in the axial, inboard direction along the vehicle spindle.

26. The method of claim 25 wherein urging the sleeve along the vehicle spindle via contact between the flange portion of the inner ring and the contact portion of the sleeve includes contacting flange portion of the inner ring with a metallic body of the sleeve.

27. The method of claim 25 wherein urging the sleeve along the vehicle spindle via contact between the wear ring of the bearing assembly and the contact portion of the sleeve includes bringing the flange portion of the inner ring into contact with the sleeve; and
wherein urging the sleeve along the vehicle spindle includes providing an axial spacing between the sleeve and the seal case of the seal.

28. A cassette seal for a wheel hub, the cassette seal comprising:
a sleeve comprising:
a sleeve body comprising:
a radially inner sleeve body portion having an opening sized to form an interference fit with a vehicle spindle;
a radially outer sleeve body portion radially outward of the radially inner sleeve body portion;
a sleeve sealing member joined to the sleeve body, the sleeve sealing member comprising:
a radially inner sleeve sealing portion configured to directly contact the vehicle spindle with the radially inner sleeve body portion in the interference fit with the vehicle spindle; and
a seal case comprising:
a seal case body comprising:
a radially outer seal case body portion configured to engage a radially inner surface of a wheel hub;
a radially inner seal case body portion; and
an intermediate seal case body portion connecting the radially outer seal case body portion and the radially inner seal case body portion, the intermediate seal case body portion proximate the radially outer sleeve body portion;
the intermediate seal case body portion comprising an inclined portion and bends connecting the inclined portion to the radially outer seal case body portion and the radially inner seal case body portion; and
a seal case sealing member comprising:
a radially outer seal case sealing portion configured to directly contact the radially inner surface of the wheel hub with the radially outer seal case body portion engaged with the radially inner surface of the wheel hub; and
a sealing portion configured to engage the radially inner sleeve body portion of the sleeve body.

29. The cassette seal of claim 28 wherein the seal case is rotatable around a central axis relative to the sleeve;

wherein the radially outer seal case body portion extends along the central axis;
wherein the radially inner seal case body portion extends radially; and
wherein the inclined portion of the intermediate seal case body portion extends transversely to the radially outer seal case body portion and the radially inner seal case body portion.

30. The cassette seal of claim 28 wherein the radially outer seal case body portion is tubular;
wherein the radially inner seal case body portion extends radially; and
wherein the inclined portion of the intermediate seal case body portion is annular and has a decreasing inner diameter as the inclined portion extends toward the radially inner seal case body portion.

31. The cassette seal of claim 28 wherein the sleeve body is made of a first metallic material and the seal case body is made of a second metallic material that is the same or different than the first metallic material; and
wherein the sleeve sealing member is made of a first polymeric material and the seal case sealing member is made of a second polymeric material that is the same or different than the first polymeric material.

32. The cassette seal of claim 28 further comprising a biasing member keeping the sealing portion of the seal case sealing member engaged with the radially inner sleeve body portion of the sleeve body.

33. The cassette seal of claim 28 further comprising a retainer connected to the sleeve body to capture the radially inner seal case body portion between the retainer and the radially outer sleeve body portion of the sleeve body.

34. The cassette seal of claim 28 wherein the sleeve sealing member includes a protrusion extending axially from a radially outer end of the radially outer sleeve body portion.

35. The cassette seal of claim 34 wherein the protrusion of the sleeve sealing member extends from a surface of the radially outer sleeve body portion toward the seal case body; and
wherein the seal case sealing member includes another sealing portion configured to engage the surface of the radially outer sleeve body portion.

36. The cassette seal of claim 34 wherein the seal case sealing member has a unitary, one-piece construction and includes an intermediate portion; and
wherein the protrusion of the sleeve sealing member extends toward and is spaced from the intermediate portion of the seal case sealing member.

* * * * *